United States Patent
Xie et al.

(10) Patent No.: US 12,339,853 B2
(45) Date of Patent: Jun. 24, 2025

(54) DATA QUERY APPARATUS, METHOD, AND STORAGE MEDIUM

(71) Applicant: STARLORD (CAYMAN) LIMITED, Grand Cayman (KY)

(72) Inventors: Chao Xie, San Francisco, CA (US); Bolong Zheng, Shanghai (CN); Qi Hu, Shanghai (CN); Ziyang Yue, Shanghai (CN)

(73) Assignee: STARLORD (CAYMAN) LIMITED, Grand Cayman (KY)

( * ) Notice: Subject to any disclaimer, the term of this patent is extended or adjusted under 35 U.S.C. 154(b) by 250 days.

(21) Appl. No.: 17/931,671

(22) Filed: Sep. 13, 2022

(65) Prior Publication Data
US 2024/0086408 A1    Mar. 14, 2024

(51) Int. Cl.
*G06F 16/2455* (2019.01)
*G06F 16/22* (2019.01)
*G06F 16/28* (2019.01)

(52) U.S. Cl.
CPC .... *G06F 16/24554* (2019.01); *G06F 16/2237* (2019.01); *G06F 16/285* (2019.01)

(58) Field of Classification Search
CPC .......... G06F 16/24554; G06F 16/2237; G06F 16/285; G06F 16/2453
See application file for complete search history.

(56) References Cited

U.S. PATENT DOCUMENTS

| | | | |
|---|---|---|---|
| 8,676,729 B1 * | 3/2014 | Keralapura | H04L 63/1416 706/12 |
| 11,360,982 B1 | 6/2022 | Liu et al. | |
| 11,392,596 B2 * | 7/2022 | Wu | G06F 16/24542 |

(Continued)

FOREIGN PATENT DOCUMENTS

| | | |
|---|---|---|
| CN | 112905595 A | 6/2021 |
| CN | 113449132 B | 2/2022 |

(Continued)

OTHER PUBLICATIONS

Marcus et al. "Plan-Structured Deep Neural Network Models for Query Performance Prediction", 2019, https://www.vldb.org/pvldb/vol12/p1733-marcus.pdf (Year: 2019).*

(Continued)

*Primary Examiner* — Matthew J Ellis
(74) *Attorney, Agent, or Firm* — Kim IP Law Group LLC

(57) ABSTRACT

A database system that, after receiving the query request, adopts a pre-trained deep learning model to predict probing cardinality corresponding to the query request based on the query vector in the query request, the number of vectors of the query result, and the vector corresponding to the distances between the query vector and the center vector of a plurality of data partitions stored in the storage device. The system then determines the target data partitions according to the probing cardinality, and obtains the query result from the target data partitions. Since the probing cardinality is dynamically determined based on the query request, decreases to both the query efficiency due to a larger setting of the probing cardinality, and the query recall due to a smaller setting of the probing cardinality are avoided, which is beneficial in reducing the average number of target data partitions and improving query efficiency.

17 Claims, 13 Drawing Sheets

(56) References Cited

U.S. PATENT DOCUMENTS

| | | | |
|---|---|---|---|
| 2007/0276802 A1 | | 11/2007 | Piedmonte |
| 2017/0091269 A1 | | 3/2017 | Zhu et al. |
| 2017/0140012 A1 | * | 5/2017 | Bortnikov ............ G06V 10/763 |
| 2017/0213257 A1 | | 7/2017 | Murugesan et al. |
| 2018/0101570 A1 | * | 4/2018 | Kumar .............. G06F 18/23213 |
| 2019/0026336 A1 | | 1/2019 | Tian |
| 2019/0236167 A1 | * | 8/2019 | Hu .................... G06F 16/24578 |
| 2020/0065412 A1 | | 2/2020 | Braundmeier |
| 2021/0035020 A1 | | 2/2021 | Boulineau et al. |
| 2022/0036123 A1 | * | 2/2022 | Cummings ............ G06N 20/00 |
| 2023/0409889 A1 | * | 12/2023 | Haykal .................. G06N 3/063 |

FOREIGN PATENT DOCUMENTS

| | | |
|---|---|---|
| CN | 114329094 A | 4/2022 |
| WO | 2022177150 A1 | 8/2022 |

OTHER PUBLICATIONS

Tao et al. "Query-level loss functions for information retrieval", Mar. 2008, https://www.sciencedirect.com/science/article/pii/S0306457307001276 (Year: 2008).*

Sun et al. "Learned Cardinality Estimation for Similarity Qeries", Jun. 25, 2021, https://dl.acm.org/doi/pdf/10.1145/3448016.3452790 (Year: 2021).*

Yang et al. "Deep Unsupervised Cardinality Estimation", 2019, https://vldb.org/pvldb/vol13/p279-yang.pdf (Year: 2019).*

Zheng et al. "Learned Probing Cardinality Estimation for High-Dimensional Approximate NN Search", 2023, https://ieeexplore.ieee.org/stamp/stamp.jsp?arnumber=10184837&tag=1 (Year: 2023).*

Sun Y, Chun S-J, Lee Y. Learned Semantic Index Structure Using Knowledge Graph Embedding and Density-Based Spatial Clustering Techniques. Applied Sciences. 2022; 12(13):6713. https://doi.org/10.3390/app12136713 (Year: 2022).*

United States Patent and Trademark Office, Office Action in corresponding U.S. Appl. No. 18/054,323, dated Mar. 1, 2024.

United States Patent and Trademark Office, Office Action in corresponding U.S. Appl. No. 18/054,323, dated Sep. 10, 2024.

United States Patent and Trademark Office, Office Action in corresponding U.S. Appl. No. 18/062,408, dated Jul. 11, 2024.

United States Patent and Trademark Office, Office Action in corresponding U.S. Appl. No. 18/062,408, dated Sep. 5, 2024.

Conglong Li, Improving Approximate Nearest Neighbor Search through Learned Adaptive Early Termination, Research 29: Data Mining and Similarity Search, Jun. 14-19, 2020, p. 2539-2554, Portland, OR.

* cited by examiner

DATA QUERY APPARATUS, METHOD, AND STORAGE MEDIUM

FIELD

The disclosure relates in general to the field of data processing, and more particularly, to a data query apparatus, method, and storage medium.

BACKGROUND

With the development of artificial intelligence technology, the application of deep learning models in daily life have become more and more widespread. As such, database systems for storing data related to deep learning models, such as vector database systems for storing vectors, are also becoming more widespread. In order to improve the query speed, in the vector database system, the vectors in the database are usually divided into a plurality of data partitions by clustering or the like, where each vector in a data partition has a high similarity to the center vector (also called the clustering center) of the data partition. When querying data in a database system, for example, when querying k vectors with the largest similarity to the query vector, only one or more data partitions whose center vector has a higher similarity to the query vector need to be queried, instead of querying all the data partitions.

Conventionally, the number of data partitions to be queried (hereinafter, referred to as probing cardinality) is usually set as a fixed constant for the database systems. As such, for any query request, the database system first determines the data partitions to be queried, of a number of the probing cardinality, and then obtains the query result of the query request from the determined target data partitions. However, when the probing cardinality is set as a larger value, the number of the data partitions to be queried will be larger. Because the number of the data partitions to be queried will be larger, the current searching process introduces query latency, thereby decreasing the efficiency. In contrast, the probing cardinality can be set as a smaller value to reduce the query, but the result recall of the query can be low because the number of target data partitions is smaller. Therefore, determining the probing cardinality is a current problem to be solved.

BRIEF SUMMARY

The following examples pertain to embodiments described throughout this disclosure.

One or more embodiments may include an apparatus having a memory storing instructions; and a processor configured to execute the instructions to: receive a query request for a storage device storing vector data, wherein: the vector data is divided into a plurality of data partitions, each of the data partitions includes a center vector, and the query request comprises a query vector and a result number; predict, via a pre-trained deep learning model, a number of the plurality of data partitions to be queried based on the query vector, the result number, and a vector corresponding to one or more distances between the query vector and the center vector of each of the data partitions, determine from the plurality of data partitions at least one target data partition having a corresponding center vector that is least distant from the query vector, wherein the number of the at least one target data partitions is the same as the number of data partitions to be queried, and determine a query result corresponding to the query request from the at least one target data partition.

One or more embodiments may include an apparatus, wherein the processor is further configured to: determine, via a first coding network, a first embedded feature of the query vector based on coding a plurality of sub-vectors of the query vector; determine, via a second encoding network, a second embedded feature of the result number; determine, via a third coding network, a third embedded feature of the vector corresponding to the distances between the query vector and the center vector of each of the data partitions; and predict, via a decoding network, the number of data partitions based on the first embedded feature, the second embedded feature, and the third embedded feature.

One or more embodiments may include an apparatus wherein: the pre-trained deep learning model is trained based at least partially on the following loss function:

$$L = \frac{1}{m}\left[\sum\nolimits_{j:p-p_j \geq p-s_j} \gamma(p - s_j - p - p_j)^2 + \sum\nolimits_{j:p-p_j < p-s_j} (1-\gamma)(p - s_j - p - p_j)^2\right],$$

wherein L is a loss function, m is a number of query requests, $p-p_j$ is the number of data partitions to be queried corresponding to the j-th query request predicted via the pre-trained deep learning model, $p-s_j$ is the number of query data partitions to be queried with reference to the j-th query request, and $\gamma$ is a super parameter smaller than 0.5.

One or more embodiments may include an apparatus wherein the vector data is partitioned into the plurality of data partitions by a hierarchical clustering method.

One or more embodiments may include an apparatus wherein the vector data in each of the plurality of data partitions are arranged in ascending order of distances between the vector data and the center vector of a corresponding data partition.

One or more embodiments may include an apparatus, wherein the processor is further configured to: determine an intermediate query result, wherein a number of result vectors included in the intermediate query result is the same as the result number; determine first type vectors of each at least one target data partition, wherein: an absolute value of difference between a distance between a corresponding first type vector and a corresponding center vector of a corresponding data partition of the at least one target data partition storing the corresponding first type vector and a first distance is smaller than the distance between the corresponding first type vector and the query vector, the first type vectors are a vector type having a largest distance from the query vector in the intermediate query result, and the first distance is the distance between the center vector of the corresponding data partition of the at least one target data partition storing the corresponding first type vector and the query vector; determine distances between the query vector and the first vector types; update the intermediate query result according to the distances between the query vector and the first type vectors; and take the intermediate query result as the query result of the query request after at least one target data partition are queried.

One or more embodiments may include an apparatus, wherein the processor is further configured to: update a second type vector into the intermediate query result and delete the first type vector from the intermediate query result when the distance between the second type vector and the query vector is smaller than the distance between the first type vector and the query vector.

One or more embodiments may include an apparatus, wherein: the distance between the query vector and each of the first type vectors is an asymmetric distance.

One or more embodiments may include an apparatus, wherein the processor is further configured to determine the distance between the query vector and each of the first type vectors by: sequentially accumulating distances between M sub-vectors of the query vector and sub-vectors corresponding to a third type vector to obtain a distance between the query vector and the third vector, and terminating the accumulation if a value after accumulating the distance between the Nth sub-vector of the query vector and the corresponding sub-vector is greater than the distance between the first type vector and the query vector, wherein $M>1$, $1 \leq N < M$.

One or more embodiments may include an apparatus, wherein the processor is a component of a one or more query devices.

One or more embodiments may include an apparatus, wherein the one or more query devices communicate with the storage devices via network.

One or more embodiments may include a method executed by one or more processors, the method comprising: receiving a query request for one or more storage device storing vector data, wherein: the vector data is divided into a plurality of data partitions, each of the plurality of data partitions including a center vector, and the query request comprises a query vector and a result number; predicting, via a pre-trained deep learning model, a number of the plurality of data partitions to be queried based on the query vector, the result number, and a vector corresponding to one or more distances between the query vector and the center vector of each of the plurality of data partitions; determining from the plurality of data partitions at least one target data partition whose corresponding center vector is least distant from a corresponding query vector, wherein a number of target data partitions is the same as the predicted number of data partitions to be queried; and determining the query result corresponding to the query request from the at least one target data partition.

One or more embodiments may include a method, wherein predicting, via a pre-trained deep learning model, the number of the plurality of data partitions, comprises: determining, via a first coding network, a first embedded feature of the query vector based on coding a plurality of sub-vectors of the query vector; determining, via a second encoding network, a second embedded feature of the result number; determining, via a third coding network, a third embedded feature of the vector corresponding to the distances between the query vector and the center vector of each of the data partitions; and predicting, via a decoding network, the number of data partitions based on the first embedded feature, the second embedded feature, and the third embedded feature.

One or more embodiments may include a method, wherein determining the query result corresponding to the query request from the at least one target data partition comprises: determining an intermediate query result, wherein a number of result vectors included in the intermediate query result is the same as the result number; determining first type vectors of each at least one target data partition, wherein: an absolute value of difference between a distance between a corresponding first type vector and a corresponding center vector of a corresponding data partition of the at least one target data partition storing the corresponding first type vector and a first distance is smaller than the distance between the corresponding first type vector and the query vector, the first type vectors are a vector type having a largest distance from the query vector in the intermediate query result, and the first distance is the distance between the center vector of the corresponding data partition of the at least one target data partition storing the corresponding first type vector and the query vector; determining distances between the query vector and the first vector types; updating the intermediate query result according to the distances between the query vector and the first type vectors; and taking the intermediate query result as the query result of the query request after at least one target data partition are queried.

One or more embodiments may include a method, wherein updating the intermediate query result comprises: updating a second type vector into the intermediate query result and deleting the first type vector from the intermediate query result when the distance between the second type vector and the query vector is smaller than the distance between the first type vector and the query vector.

One or more embodiments may include a method, wherein: the distance between the query vector and each of the first type vectors is an asymmetric distance; and the method further comprises: sequentially accumulating distances between M sub-vectors of the query vector and sub-vectors corresponding to a third type vector to obtain a distance between the query vector and the third vector, and terminating the accumulating if a value after accumulating the distance between the Nth sub-vector of the query vector and the corresponding sub-vector is greater than the distance between the first type vector and the query vector, wherein $M>1$, $1 \leq N < M$.

One or more embodiments may include computer-readable storage medium storing instructions, wherein the instructions, when executed on a machine, cause the machine to: receive a query request for one or more storage device storing vector data, wherein the query request comprises a query vector and a result number; predict, via a pre-trained deep learning model, a number of the plurality of data partitions to be queried based on the query vector, the result number, and a vector corresponding to one or more distances between the query vector and the center vector of each of the plurality of data partitions; determine from the plurality of data partitions at least one target data partition whose corresponding center vector is least distant from a corresponding query vector, wherein a number of target data partitions is the same as the predicted number of data partitions to be queried; and determining the query result corresponding to the query request from the at least one target data partition.

One or more embodiments may include a storage medium, wherein the instructions cause the machine to: determine, via a first coding network, a first embedded feature of the query vector based on coding a plurality of sub-vectors of the query vector; determine, via a second encoding network, a second embedded feature of the result number; determine, via a third coding network, a third embedded feature of the vector corresponding to the distances between the query vector and the center vector of each of the data partitions; and predict, via a decoding network, the number of data partitions based on the first embedded feature, the second embedded feature, and the third embedded feature.

One or more embodiments may include a storage medium, wherein the instructions cause the machine to: determine an intermediate query result, wherein a number of result vectors included in the intermediate query result is the same as the result number; determine first type vectors of each at least one target data partition, wherein: an absolute value of difference between a distance between a corresponding first type vector and a corresponding center vector of a corresponding data partition of the at least one target data partition storing the corresponding first type vector and a first distance is smaller than the distance between the corresponding first type vector and the query vector, the first type vectors are a vector type having a largest distance from the query vector in the intermediate query result, and the first distance is the distance between the center vector of the corresponding data partition of the at least one target data partition storing the corresponding first type vector and the query vector; determine distances between the query vector and the first vector types; update the intermediate query result according to the distances between the query vector and the first type vectors; and take the intermediate query result as the query result of the query request after at least one target data partition are queried.

One or more embodiments may include a storage medium, wherein the instructions cause the machine to: update a second type vector into the intermediate query result and delete the first type vector from the intermediate query result when the distance between the second type vector and the query vector is smaller than the distance between the first type vector and the query vector.

BRIEF DESCRIPTION OF THE SEVERAL VIEWS OF THE DRAWINGS

The foregoing summary, as well as the following detailed description of the exemplary embodiments, will be better understood when read in conjunction with the appended drawings. For the purpose of illustrating the present disclosure, there are shown in the drawings embodiments, which are presently preferred. It should be understood, however, that the present disclosure is not limited to the precise arrangements and instrumentalities shown.

In the drawings.

DETAILED DESCRIPTION

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Furthermore, the described features, advantages and characteristics of the exemplary embodiments of the subject disclosure may be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages may be recognized in certain embodiments that may not be present in all exemplary embodiments of the subject disclosure.

Figure 1:
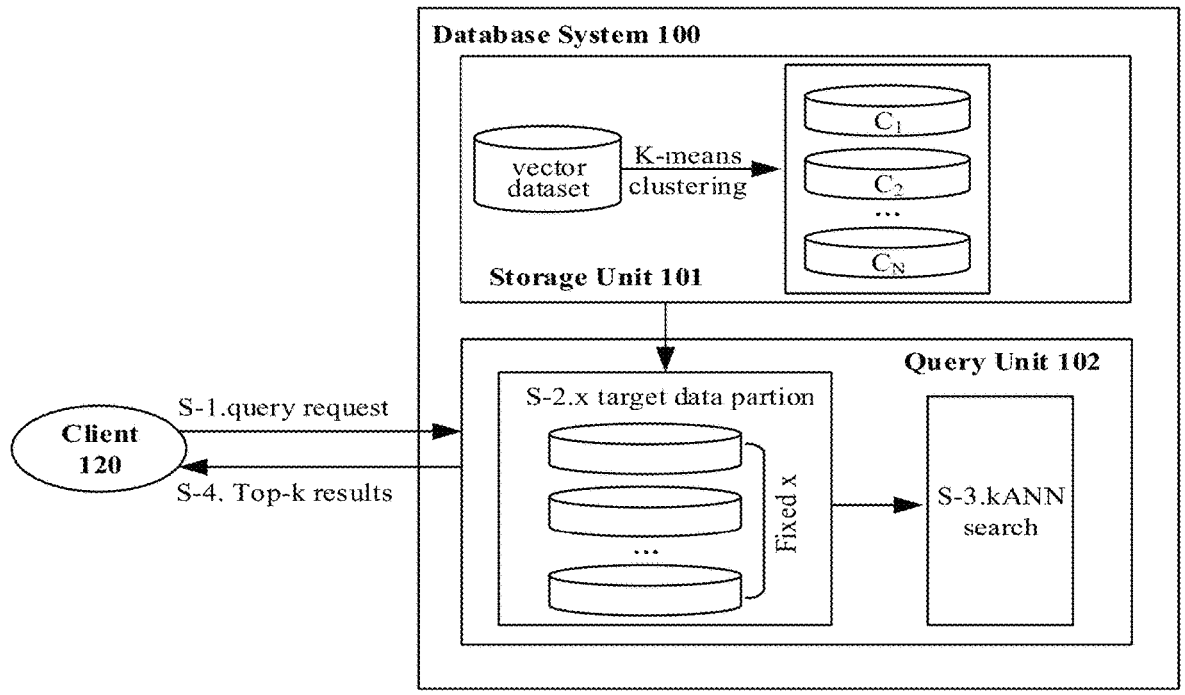
FIG. 1 illustrates a schematic diagram of querying data in database system.

FIG. 1 illustrates a schematic diagram of querying data in a database system 100. While FIG. 1 illustrates various systems and components contained in the database system 100, FIG. 1 illustrates one example of a database system 100 of the present disclosure, and additional components can be added and existing systems and components can be removed.

As shown in FIG. 1, the database system 100 includes a storage unit 101 and a query unit 102. The vector data stored in the storage unit 101 is divided into N data partitions by a K-mean clustering algorithm (K-means), that is, data partition $C_1$, a data partition $C_2$, . . . , data partition $C_N$. When receiving the query request sent by the client 120, the query unit 102 queries k vectors corresponding to the query request from x (x is a fixed value) data partitions and sends the query request to the client 120.

The process of the query unit 102 responding to the query request includes the following steps: receive a query request sent by the client 20 (S-1); determine x target data partitions with the largest similarity between the center vector and the query vector of the query request among the N data partitions (S-2); perform an approximate k nearest neighbor (kANN) from the x target data partitions to obtain k vectors having the highest similarity (i.e., closest distance) to the query vector (S-3); send the queried k vectors to the client 120 as a result of the query request (S-4).

It will be appreciated that the kANN is to query the k vectors having the highest similarity to the query vector from plurality of vectors, and in some embodiments, the kANN may be implemented by an inverted file product quantization, IVFPQ) method. That is, the database system 0 determines x target data partitions for any query request, which the probing cardinality is a fixed value of x. As described above, when the probing cardinality is set to a large value, the number of the target data partitions will be larger, so that the number of the target data partitions to be queried will be larger, thereby increasing the query latency and the decreasing the efficiency. When the probing cardinality is set to a smaller value, although the query latency is smaller, the result recall of the query is lower because the number of target data partitions is smaller.

Figure 2:
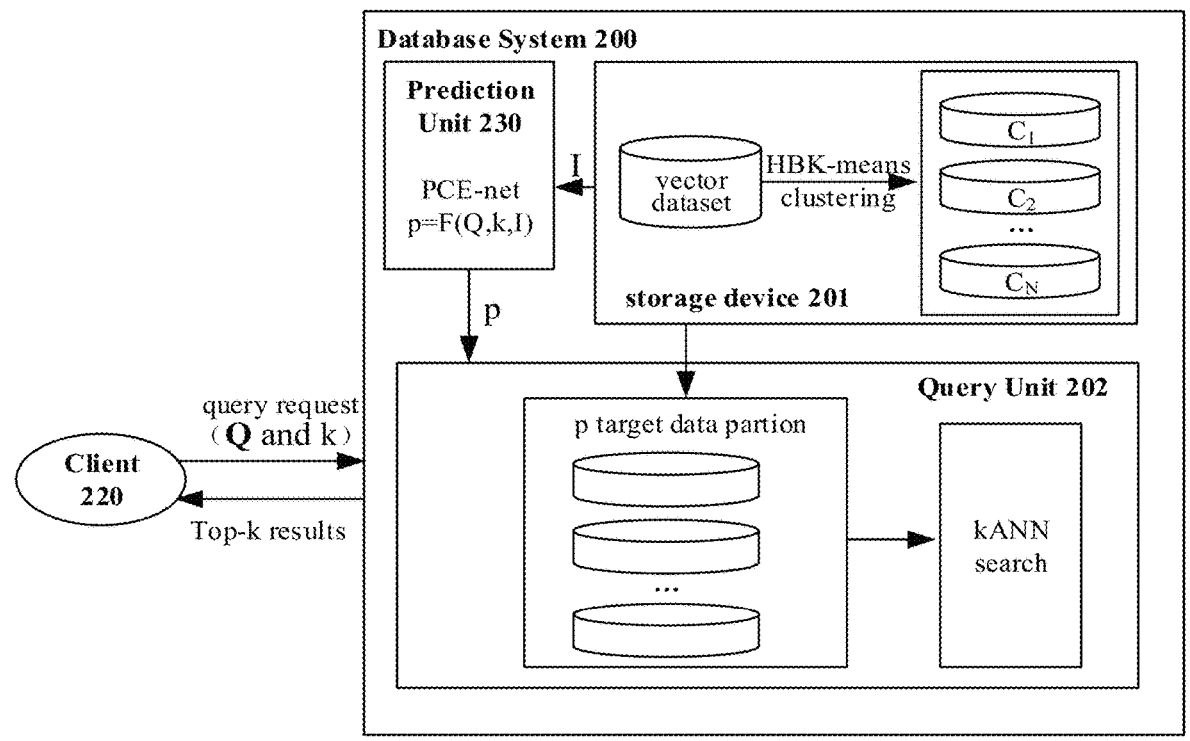
FIG. 2 illustrates a schematic diagram of querying data in another database system.

FIG. 2 illustrates a schematic diagram of querying data in a database system 200 according to an embodiment of the present disclosure. While FIG. 2 illustrates various systems and components contained in the database system 200, FIG. 2 illustrates one example of a database system 200 of the present disclosure, and additional components can be added and existing systems and components can be removed.

Referring to FIG. 2, after receiving the query request from client 220, the database system 200 can first predict the probing cardinality p corresponding to the query request based on the query vector Q in the query request, the number of the vectors in the query result (hereinafter, referred to as the result number) k, and the vector I corresponding to the distance between the center vector of each data partitions and the query vector Q (hereinafter, referred to as the distance vector I). Then, the query unit 202 determines p target data partitions, and obtains k vectors with the highest similarity to the query vector Q from the p target data partitions. Finally, the query unit 202 send the k vectors to the client 220 as query results. Compared with the database system 100, the database system 200 adopts a prediction unit 230 to predict the detection partition cardinality. Since the probing cardinality p is dynamically determined based on the query request, it is possible to avoid decreasing the query efficiency due to a larger setting of the probing cardinality or decreasing the query recall due to a smaller setting of the probing cardinality.

It will be appreciated that, each unit of the database system 200 can be configured to at least one electronic device, and the electronic device on which each unit of the database system 200 is configured can be referred to as a server, a node, etc. Further, the database system 200 can predict the probing cardinality p corresponding to the query request by using the corresponding server or node based on the query vector Q in the query request, result number k, and the distance vector I. Then, determine p target data partitions using the corresponding server or node. Finally, determine k vectors having the highest similarity with the query vector Q in the p target data partitions and send the k vectors queried to the client 220 as the query result.

It will be appreciated that, in some embodiments, the vector data in the storage unit 201 may not be clustered by the aforementioned K-means algorithm, but a hierarchical balanced clustering algorithm (HBK-means) to improve the balance of vectors quantity in each data partition. Thus, the difference in the number of vectors included in the same number of target data partitions can be reduced, avoiding that the recall of the query result is affected by the smaller number of vectors in the target data partitions. The detail description of clustering vector data by the HBK-means will be described below in further detail.

It will be appreciated that, in some embodiments, the prediction unit 230 may predict a probing cardinality p corresponding to the query request based on the query vector Q in the query request, the result number k, and distance vector I via a pre-trained deep learning model. For example, in some embodiments, the prediction unit 230 may predict a probing cardinality based on a PCE-Net model including three encoders and one decoder. The specific structure and training process of PCE-Net will be introduced below, and will not be repeated here.

It will be appreciated that, in some embodiments, the vectors in each data partition in the storage unit 201 may be arranged in ascending order of distance from the center vector of the data partition, so that the query unit 202 only needs to query a portion of the vectors in each data partition when querying the vectors in each data partition, without calculating the distance between all the vectors in the data partition and the query vector Q, thereby further increasing the query speed. For example, assuming that, among the k vectors obtained in the first target data partition, the distance between the kth vector and the query vector Q is ds-k, in which the larger the k, the larger the ds-k. Then if the distance between the ith vector in the second target data partition and the query vector Q is larger than ds-k, the ith vector is not the query result. Furthermore, when the search direction is a reverse search, all the vectors preceding the ith vector in the second target data partition cannot be used as the query result due to the distance between each vector preceding the ith vector in the second target data partition (i.e., the first vector to the i-lth vector) and the query vector Q is greater than ds-k, hence the query unit 202 does not need to compute the distance between the vectors preceding the ith vector in the second target data partition and the query vector Q. When the search direction is a sequential search, all the vectors after the ith vector in the second target data partition cannot be used as the query result due to the distance between each vector after the ith vector in the second target data partition and the query vector Q is greater than ds-k, hence the query unit 202 does not need to compute the distance between the vectors after the ith vector in the second target data partition and the query vector Q. The amount of computation when querying in the second target data partition is reduced, results in improvement of querying efficiency.

It will be appreciated that, the storage vectors in the database system 200 may be feature vectors of various types of unstructured data (e.g., text, images, audio, video, DNA sequences, commodity information, material structures, etc.). According to a query request provided by a user, the database system 200 can obtain k query results with the highest similarity of a query vector Q corresponding to the query request, and can be used for returning a picture most similar to an uploaded picture in real time from a mass database, retrieving a similar video or conducting real-time video recommendation according to a video key frame, quickly retrieving audio data such as mass speech/music/sound effect and returning a similar audio, retrieving a similar chemical molecular structure/superstructure/substructure, recommending relevant information or commodities according to user behaviors and requirements, automatically answering a question and confusing a user by an interactive intelligent question and answering robot, classifying genes by comparing similar DNAs, and helping the user search required information through keywords from a text database.

It will be appreciated that, in some embodiments, the query vector Q may not be included in the above query request, but may be generated by the database system based on user-supplied data, for example, based on image/video/text/audio/DNA sequences/commodity information/substance results uploaded by the user.

For ease of understanding, the process of clustering vector data based on the HBK-means method will be described below.

Assuming that $ce_i$ is the center vector of the data partition $C_i$, and $cn_i$ is the number of vectors in the data partition $C_i$. Then for any vector b, the data partition $C_t$ corresponding to the vector b should satisfy the conditions shown in the following equation (1).

$$C_t = \operatorname*{argmin}_{c_i}(dist(b, ce_i) + \lambda_i \cdot cn_i) \quad (1)$$

wherein $$\operatorname*{argmin}_{c_i}(Y)$$

represents $C_i$ that minimizes the value of expression Y; $dist(b, ce_i)$ represents the distance between vector b and vector $ce_i$; $\lambda_i$ represents a balance parameter corresponding to the data partition $C_i$, and the balance parameter is used to control the degree of aggregation of vector data in the clustering result of the vector data by the HBK-means method and the degree of balance of the number of vectors in each data partition.

Figure 3:
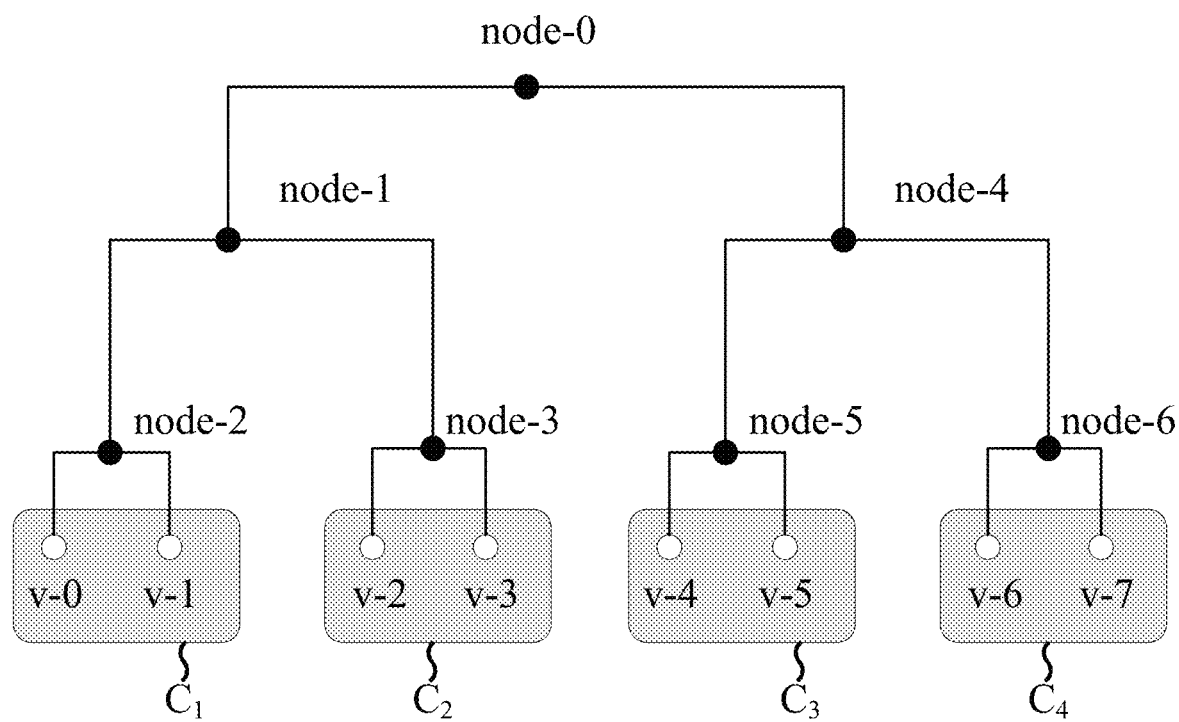
FIG. 3 illustrates a schematic diagram of a clustering tree.

It will be appreciated that, the result of clustering vector data based on the HBK-means method can be expressed as a clustering tree, which includes a root node and multiple child nodes, and each leaf node represents a data partition, each non-leaf-node represent a dataset. For example, FIG. 3 shows a schematic diagram of a clustering tree obtained by clustering vector v-0 to vector v-7. As shown in FIG. 3, the clustering tree includes a root node node-0 and multiple child nodes (node-1 to node-6), wherein node-2, node node-3, node node-5 and node node-6 are leaf nodes, corresponding to data partitions $C_1$, $C_2$, $C_3$ and $C_4$ respectively. That is, data partition $C_1$ includes vector v-0 and vector v-1, data partition $C_2$ includes vector v-2 and vector v-3, data partition $C_3$ includes vector v-4 and vector v-5, and data partition $C_4$ includes vector v-6 and vector v-7.

In order to improve the balance of the quantity of vectors of each node in the cluster tree, that is, to improve the balance of the quantity of the vectors in each data partition, the balance parameter of each node in the cluster tree can be determined based on the following equation (2).

$$\lambda_c = \alpha \cdot \frac{cnode_p}{cnode_c} \cdot \lambda_p \quad (2)$$

wherein $\alpha$ is a preset value, $\lambda_p$ represents a balance parameter of a parent node of the node node-c, $cnode_p$ represents the number of vectors included in the parent node of the node node-c, and $cnode_c$ represents the number of vectors included in the node node-c, the balance parameter of the root node node-0 is a preset constant $\lambda_0$. For example, referring to FIG. 3, the number of vectors included in the root node node-0 is 8, the number of vectors included in the node node-1 or node node-4 is 4, and the balance parameter of node node-1 or node node-4 can be obtained as $2\alpha\lambda_0$ based on the equation (2). Similarly, the balance parameter of node node-2, node node-3, node node-5 and node node-6 are $4\alpha^2\lambda_0$.

Further, the balance parameter $\lambda_i$ of the data partition $C_i$ may be represented as a balance parameter of a leaf node corresponding to the data partition. For example, based on FIG. 3, since the leaf node corresponding to the data partition $C_1$ is node-2, the leaf node corresponding to the data partition $C_2$ is node-3, the leaf node corresponding to the data partition $C_3$ is node-5, and the leaf node corresponding to the data partition $C_4$ is node-6, the balance parameters corresponding to the data partitions $C_1$ to $C_3$ are $4\alpha^2\lambda_0$. The structure and training method of the afore mentioned PCE-net model are described below.

Figure 4:
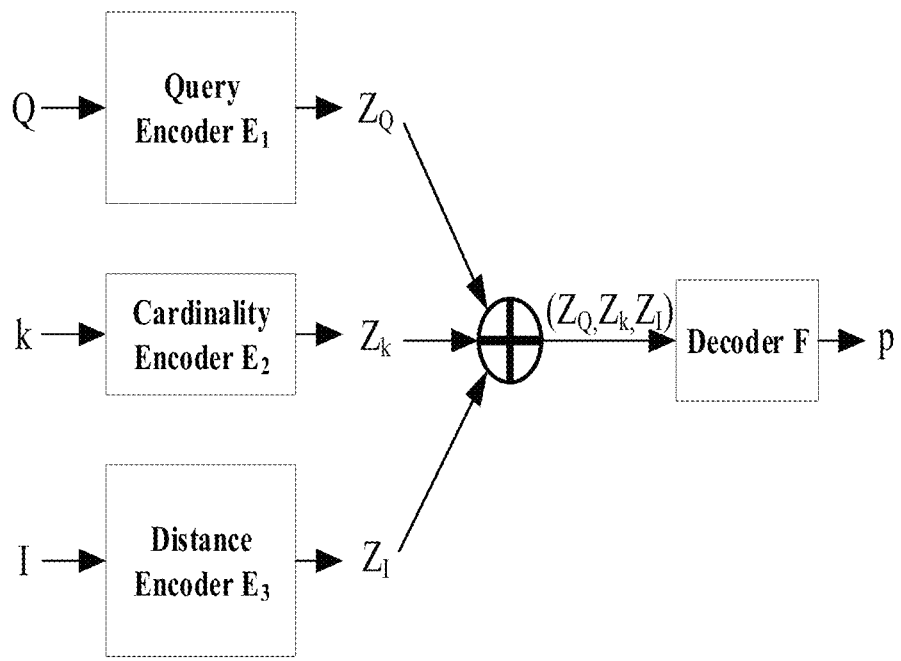
FIG. 4 illustrates a structural schematic of a PCE-net model.

FIG. 4 illustrates a structural schematic of a PCE-net model according to an embodiment of the present disclosure. As shown in FIG. 4, the PCE-Net model includes a query encoder $E_1$, a cardinality encoder $E_2$, a distance encoder $E_3$, and a decoder F. Wherein the input of the query encoder $E_1$ is a query vector Q for learning the embedding of the query vector Q ($Z_q$, i.e., the feature of the query vector Q); The input of the cardinality encoder $E_2$ is the result number k for learning the embedding of the result number k ($Z_k$); the input of the distance encoder $E_3$ is the distance vector I for learning the embedding of the distance vector I ($Z_I$); The decoder F is adopted to predict the probing cardinality p based on $Z_q$, $Z_k$ and $Z_I$. That is, the PCE-Net model actually establishes a correspondence relationship F between p and Q, I and, i.e., p=F (Q, I, k).

Figure 5:
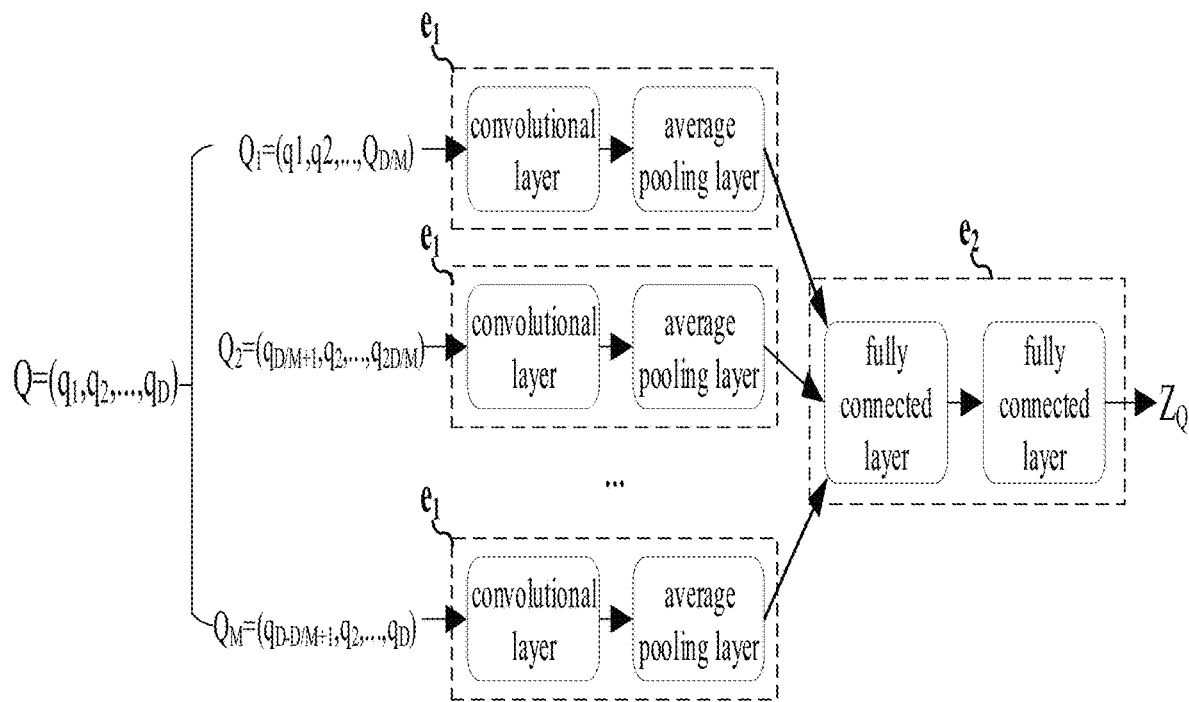
FIG. 5 illustrates a structural schematic of a query encoder $E_1$.

FIG. 5 illustrates a query encoder according to an embodiment of the present disclosure. Referring to FIG. 5, the query encoder $E_1$ first divides the query vector Q into a plurality of sub-vectors, for example, assuming that the dimension of the query vector Q is D, that is, Q=($q_1$, $q_2$, ..., $q_D$). The query encoder $E_1$ may divide the query vector Q into M sub-vectors $Q_1$, $Q_2$, ..., $Q_M$, where the dimension of each sub-vector is D/M. Then, the query encoder $E_1$ can extract the features of each sub-vector through M convolutional average pooling network sharing parameters $e_1$, and combine the feature distributions of each sub-vector through a fully connected network $e_2$ to obtain the embedded representation $Z_q$ of the query vector Q. Wherein, in some embodiments, the convolutional average pooling network $e_1$ may include one convolutional layer and one average pooling layer in series, and the fully connected network $e_2$ may include two fully connected layers in series.

It will be appreciated that, in some embodiments, the convolutional averaging pooling network $e_1$ for extracting features of different sub-vectors may also employ different parameters, or adopt other type of network to extract features of each sub-vector, which is not limited herein.

It will be appreciated that, in some embodiments, the fully connected network $e_2$ may also include more or fewer fully connected layers, and may also include other network layers, which is not limited herein.

Figure 6:
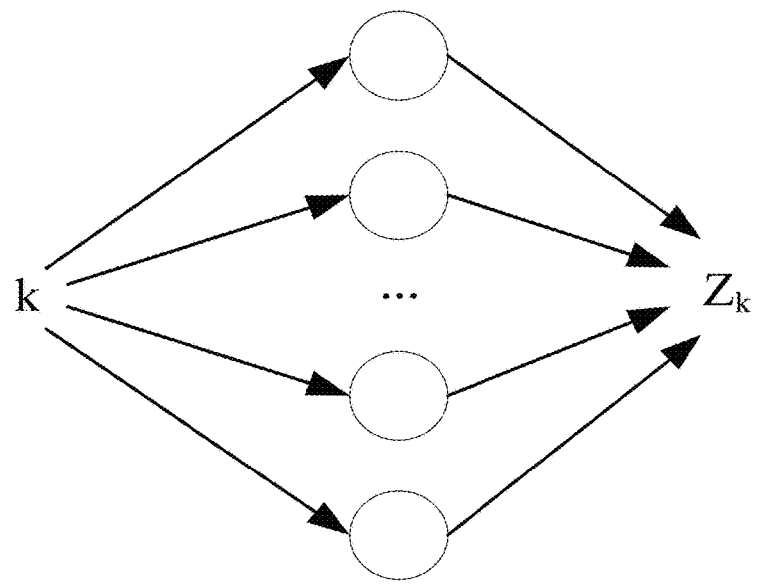
FIG. 6 illustrates a structural schematic of a cardinality encoder $E_2$.

FIG. 6 illustrates a cardinality encoder according to an embodiment of the present disclosure. Referring to FIG. 6, the cardinality encoder $E_2$ may be a fully connected network with a single hidden layer for encoding result number k resulting in an embedded $Z_k$ of result number k. In particular, since the value of result number k is constantly positive, in order to keep the predicted probing cardinality p increasing with the increasing of k, in some embodiments, the fully connected network weight corresponding to the cardinality encoder $E_2$ is constantly positive.

It will be appreciated that, in alternative embodiments, the cardinality encoder $E_2$ may also include more or fewer fully connected layers and may also include other network layers, which are not limited herein.

Figure 7:
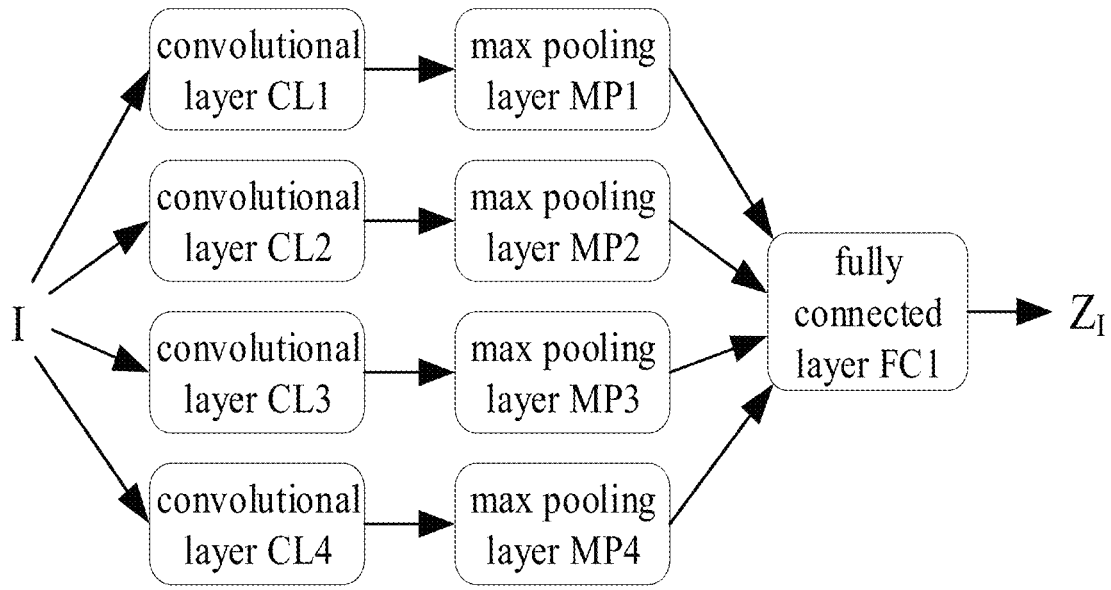
FIG. 7 illustrates a structural schematic of a distance encoder $E_3$.

FIG. 7 illustrates a distance encoder according to an embodiment of the present disclosure. Referring to FIG. 7, the distance encoder $E_3$ may include four convolutional layers (convolutional layer CL1, convolutional layer CL2, convolutional layer CL, and convolutional layer CL4), four max pooling layers (max pooling layer MP1, max pooling layer MP2, max pooling layer MP3, and max pooling layer MP4), and one fully connected layer FC1. The input of each convolutional layer is the distance vector I, the output of each max pooling layer is the input of the fully connected layer FC1, the output of the convolutional layer CL1 is the input of the max pooling layer MP1, the output of the convolutional layer CL2 is the input of the max pooling layer MP2, the output of the convolutional layer CL3 is the input of the max pooling layer MP3, and the output of the convolutional layer CL4 is the input of the max pooling layer MP4.

It is appreciated that, in alternative embodiments, the kernels of convolutional layer CL1, convolutional layer CL2, convolutional layer CL3, and convolutional layer CL4 differ in size.

Figure 8:
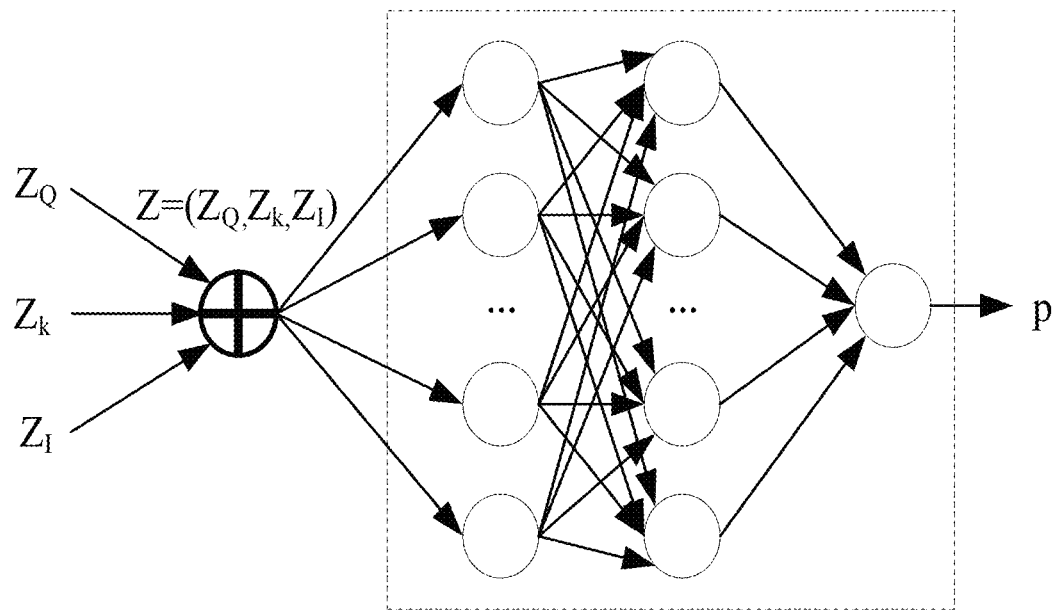
FIG. 8 illustrates a structural schematic of a decoder F.

FIG. 8 illustrates a decoder according to an embodiment of the present disclosure. Referring to FIG. 8, the decoder F includes two fully connected layers. In order to ensure that the resulting probing cardinality p is a positive number, the ReLU activation function is used in one fully connected layer and the activation function is not used in the other fully connected layer. The input of the decoder F is a vector Z obtained by concatenating the aforementioned $Z_q$, $Z_k$ and $Z_1$, i.e., Z=(Zq, Zk, ZI). Further, the computation logic of the decoder F may be expressed as the following equation (3):

$$p = W_2^T * (\text{ReLU}(W_1^T * Z + B_1)) + B_2 \qquad (3)$$

wherein, $W_2^T$ represents the weight coefficient of the fully connected layer without the activation function; $B_2$ represents a bias term of the fully connected layer without employing an activation function; $W_1^T$ represents the weight coefficient of the fully connected layer using the ReLU activation function; $B_1$ represents the bias term of the fully connected layer using the ReLU activation function; "*" denotes convolution; ReLU denotes a ReLU function for setting a number less than zero in input data to zero, keeping the number equal to or greater than zero unchanged.

It will be appreciated that in other embodiments, decoder F may also include more or fewer neural network layers, such as using only one fully connected layer, or using three fully connected layers, or adding other neural network layers, or replacing portions of the neural network layers, which is not limited herein.

Figure 9:
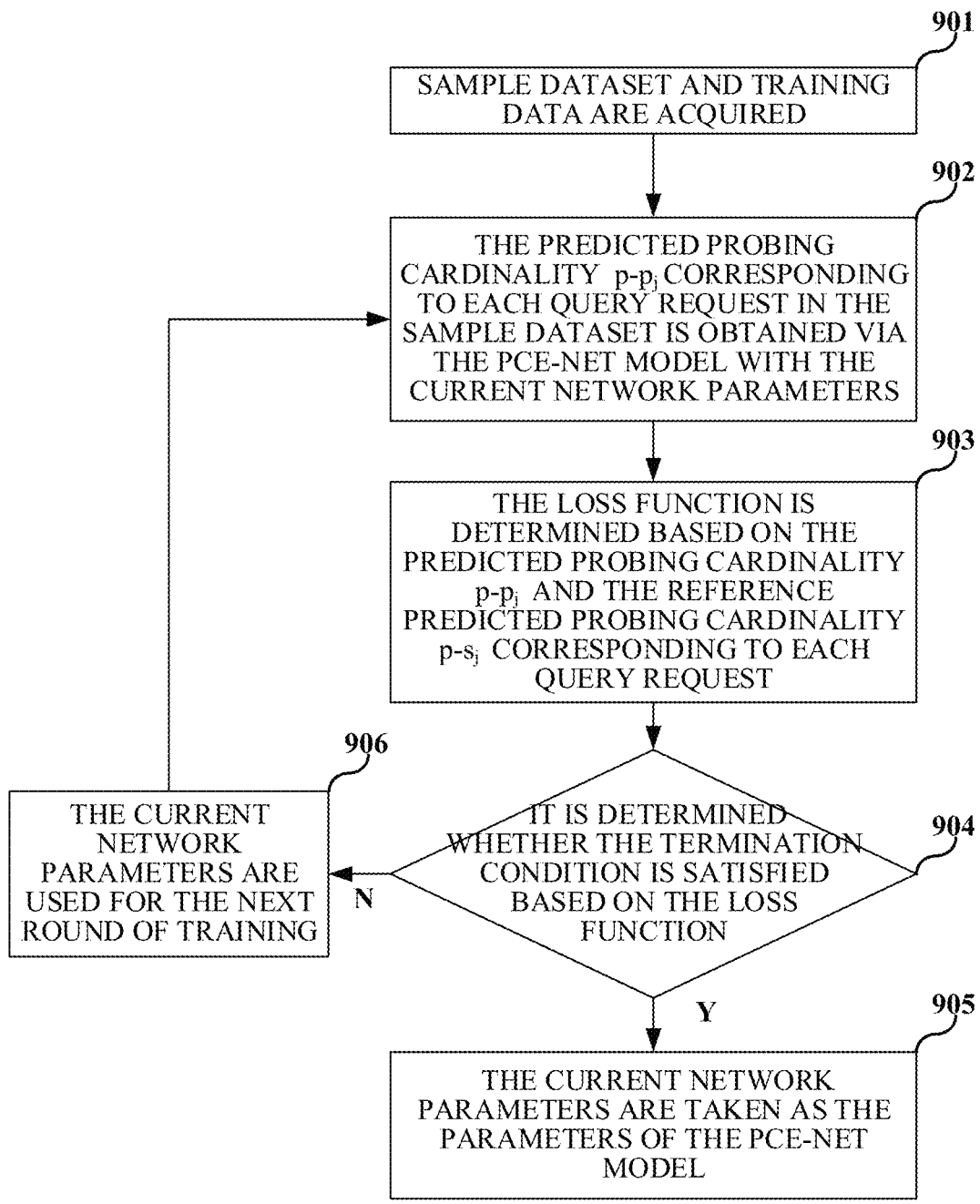
FIG. 9 illustrates a flowchart of a model training method.

Next, the training process of the PCE-net model shown in FIG. 4 to FIG. 8 will be described. FIG. 9 shows a flowchart of a model training method according to an embodiment of the present disclosure.

As shown in FIG. 9, the model training method begins at 901. In 901, sample dataset and training data are acquired. In embodiments, an electronic device acquires the sample dataset as described herein. Illustratively, the sample dataset may be clustered into and divided into N data partitions by HBK-means method and $ce_i$ is the center vector of the ith($1 \leq j \leq N$) data partitions, and the training data includes m query requests, a reference probing cardinality p-$s_j$ ($1 \leq j \leq m$) for query each query request, where each query request may include a query vector Q-j and a result number $k_j$.

It can be appreciated that: the reference probing cardinality p-$s_j$ corresponding to the query request j can be obtained by: performing a query in all data partitions based on the query request j; taking the number of partitions where the $k_j$ vectors in the query result are located as the reference probing cardinality p-$s_j$. For example, assuming that result number of a certain query request is 10, and 10 vectors obtained by performing query in all data partitions are located in 7 data partitions, the reference probing cardinality corresponding to the query request is 7.

In 902: the predicted probing cardinality p-$p_j$ corresponding to each query request in the sample dataset is obtained via the PCE-net model with the current network parameters. In embodiments, the electronic device obtains the prediction detection partition cardinality corresponding to each query request in the sample dataset via the PCE-net model with the current network parameters.

It is appreciated that the current network parameters of the PCE-net model may include weight coefficients, bias parameters, etc. of the various neural network layers of the PCE-net. In some embodiments, the current network parameters of the PCE-net model may be randomly generated as initialization of training.

In 903, the loss function is determined based on the predicted probing cardinality p-$p_j$ and the reference predicted probing cardinality p-$s_j$ corresponding to each query request. After the electronic device obtains the predicted probing cardinality p-$p_j$ corresponding to each query request based on the current network parameters, the electronic device can determine a loss function based on the predicted probing cardinality p-$p_j$ and the reference probing cardinality p-$s_j$ corresponding to each query request.

It will be appreciated that: for any query request, the predicted probing cardinality p-$p_j$ should be greater than or equal to the reference probing cardinality p-$s_j$, aiming at ensuring that query results corresponding to each query request can be obtained from the p-$p_j$ target data partitions. Thus, in designing the loss function and termination conditions, the value of the predicted probing cardinality p-$p_j$ should be minimized while ensuring that the predicted probing cardinality p-$p_j$ corresponding to each query request should be greater than or equal to the reference probing cardinality p-$s_j$.

In particular, in some embodiments, the loss function may be determined based on the following equation (4):

$$L = \frac{1}{m} \left[ \sum_{j: p-p_j \geq p-s_j} \gamma(p-s_j - p-p_j)^2 + \sum_{j: p-p_j < p-s_j} (1-\gamma)(p-s_j - p-p_j)^2 \right] \qquad (4)$$

wherein L is the loss Function, $\gamma$ is an adjustable hyperparameter. Generally, $\gamma<0.5$, which means if the predicted probing cardinality p-$p_j$ is smaller than the reference probing cardinality p-$s_j$, the penalty may be larger. Therefore, when there is a query request that predicted probing cardinality p-p$_j$ is smaller than the reference probing cardinality p-s$_j$, the loss function will increase more rapidly.

It will be appreciated that in other embodiments, the loss function may be set in other ways and is not limited herein.

In 904, it is determined whether the termination condition is satisfied based on the loss function. In embodiments, the electronic device determines whether the termination condition is satisfied based on the loss function. If the termination condition is satisfied, indicates that the current network parameter can be taken as a parameter of the PCE-net model, and the process proceeds to 905. Otherwise, it is indicated that training needs to be continued, and the process goes to step 906.

It is appreciated that the termination condition may include at least one of the following conditions: The value of the loss function L reaches a minimum value, the loss function L converges, and the value of the loss function L is less than a preset loss function value. It is appreciated that in other embodiments, termination conditions may include other conditions, and is not limited herein.

In 905, the current network parameters are taken as the parameters of the PCE-net model. In embodiments, when it is determined that the termination condition is satisfied, the electronic device ends the training by taking the current network parameter as a parameter of the PCE-net model.

In 906, the current network parameters are used for the next round of training. IN embodiment, when it is determined that the termination condition is not met, the electronic device updates the current network parameters, proceeds to step 902 and performs the next round of training.

Illustratively, in some embodiments, the electronic device may update the current network parameters according to equation (5) below.

$$\theta' = \theta + \eta \cdot \nabla\theta \cdot L \qquad (5)$$

wherein $\theta$ represents a current network parameter, and $\theta$ may include weight coefficients, offset parameters of each neural network layer in the PCE-net model; $\theta'$ is the updated network parameter, $\eta$ is the preset hyperparameter, $\nabla\theta$ is the gradient of $\theta$, and L is the loss function.

It will be appreciated that in other embodiments, the electronic device may update the current network parameters in other ways and are not limited herein.

Based on the PCE-net model, the probing cardinality p corresponding to the query request can be obtained more accurately. For example, according to some embodiments of the disclosure, FIG. 10 illustrates a comparison of between the probing cardinalities predicted by the PCE-net model based on SIFT dataset and h the probing cardinalities predicted by and an IVF-Flat algorithm based result number is different on the SIFT dataset t, and FIG. 11 illustrates a comparison between the probing cardinalities predicted by the PCE-net model based on GIST dataset and the probing cardinalities predicted by an IVF-Flat algorithm based on the GIST dataset.

Figure 10:
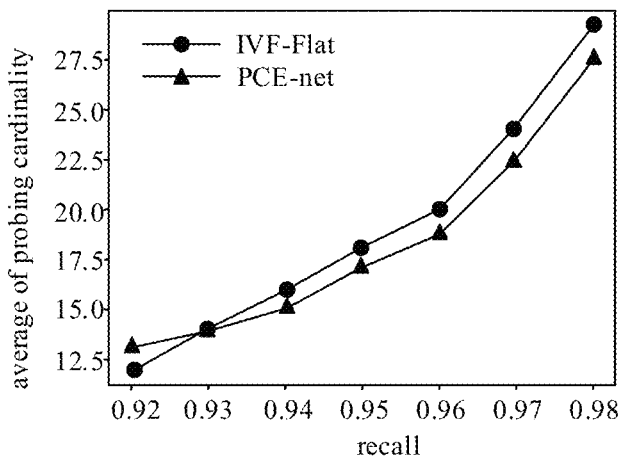
FIG. 10 illustrates a comparison between the probing cardinalities predicted by the PCE-net model based on SIFT dataset and the probing cardinalities predicted by an IVF-Flat algorithm based on the SIFT dataset.
Figure 10:
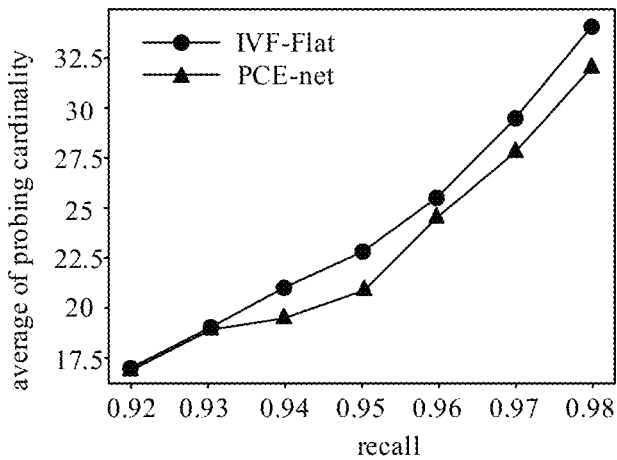
Figure 10:
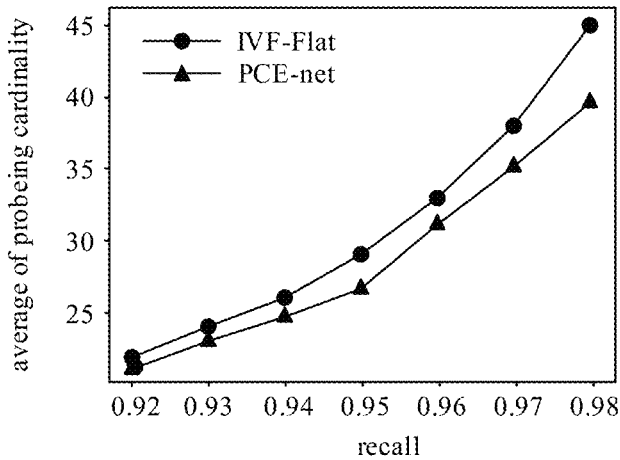

Referring to FIG. 10, the abscissa represents the recall, and the ordinate represents the average of the probing cardinalities predicted for a plurality of query requests. At k=1, the mean value of probing cardinalities predicted by the PCE-net model based on the SIFT dataset is higher than the fixed probing cardinality of the IVF-Flat algorithm only when the target recall is 0.92, and is smaller than that of IVF-Flat algorithm in the other cases. At k=10, the mean value of probing cardinalities predicted by the PCE-net model based on the SIFT dataset is equal to the fixed probing cardinality of IVF-Flat algorithm only when the target recalls are 0.92 and 0.93, and is smaller than that of the IVF-Flat algorithm in the other cases. At k=50, the mean value of probing cardinalities predicted by the PCE-net model based on the SIFT dataset is less than the fixed probing cardinality of the IVF-Flat algorithm in any cases.

Figure 11:
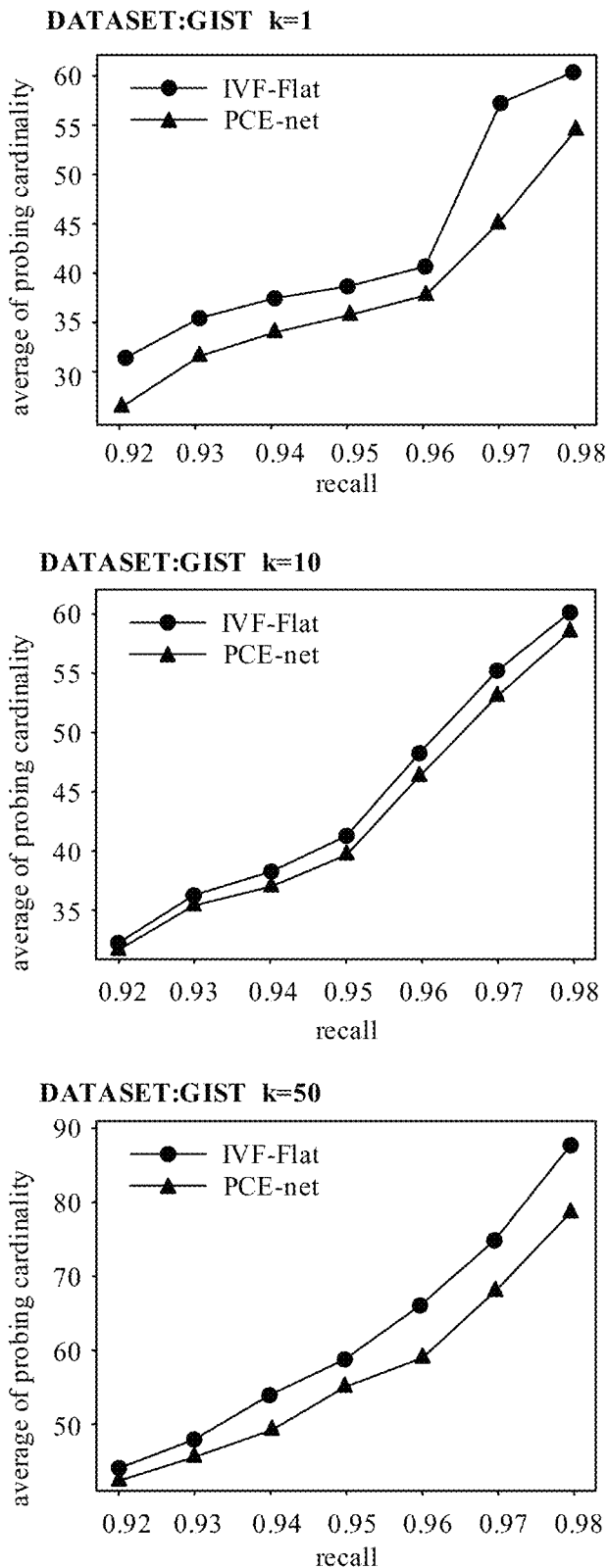
FIG. 11 illustrates a comparison between the probing cardinalities predicted by the PCE-net model based on GIST dataset and the probing cardinalities predicted by an IVF-Flat algorithm based on the GIST dataset.

Referring to FIG. 11, the abscissa represents the recall, and the ordinate represents the average of the probing cardinalities predicted for a plurality of query requests. In the case of k=1, k=10, or k=50, the mean value of probing cardinalities predicted by the PCE-net model based on the GIST dataset is less than the fixed probing cardinality of the IVF-Flat algorithm at the same recall.

That is to say, in most cases, when the recall is the same, the mean value of probing cardinalities predicted by the PCE-net model is smaller than the fixed probing cardinality of IVF-Flat algorithm, so that when the query is performed based on the predicted probing cardinalities, the number of the target data partitions to be queried by the database system 1 is smaller, the query latency is smaller, and the efficiency is higher.

Figure 12A:
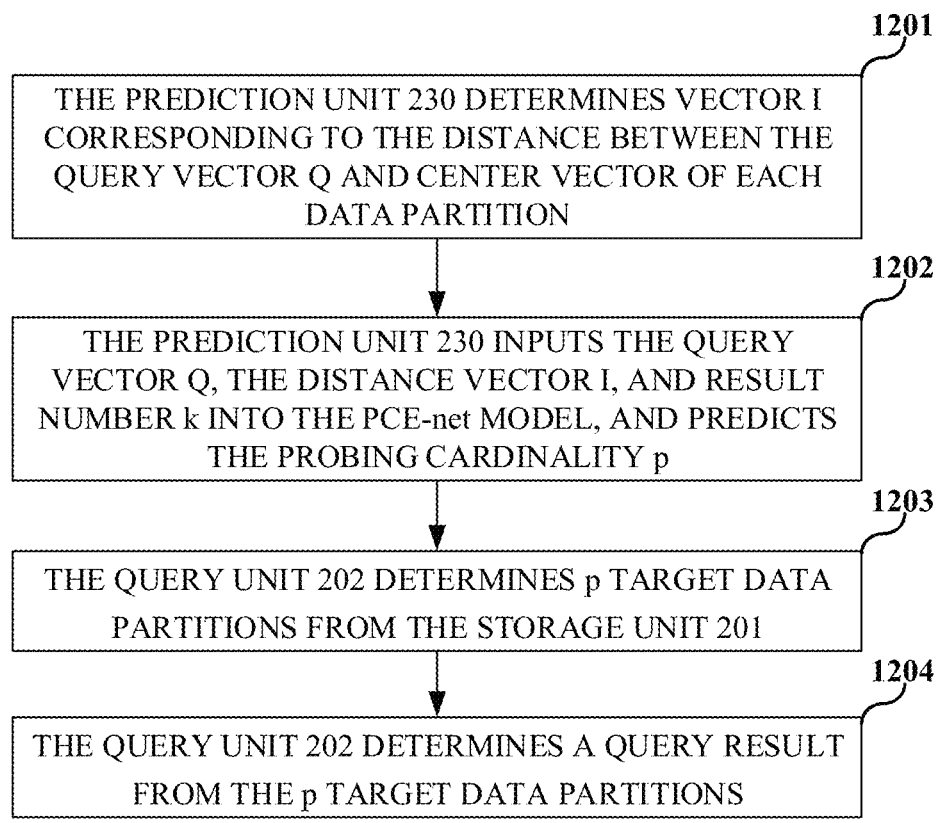
FIG. 12A illustrates a flowchart of a data query method.
Figure 12B:
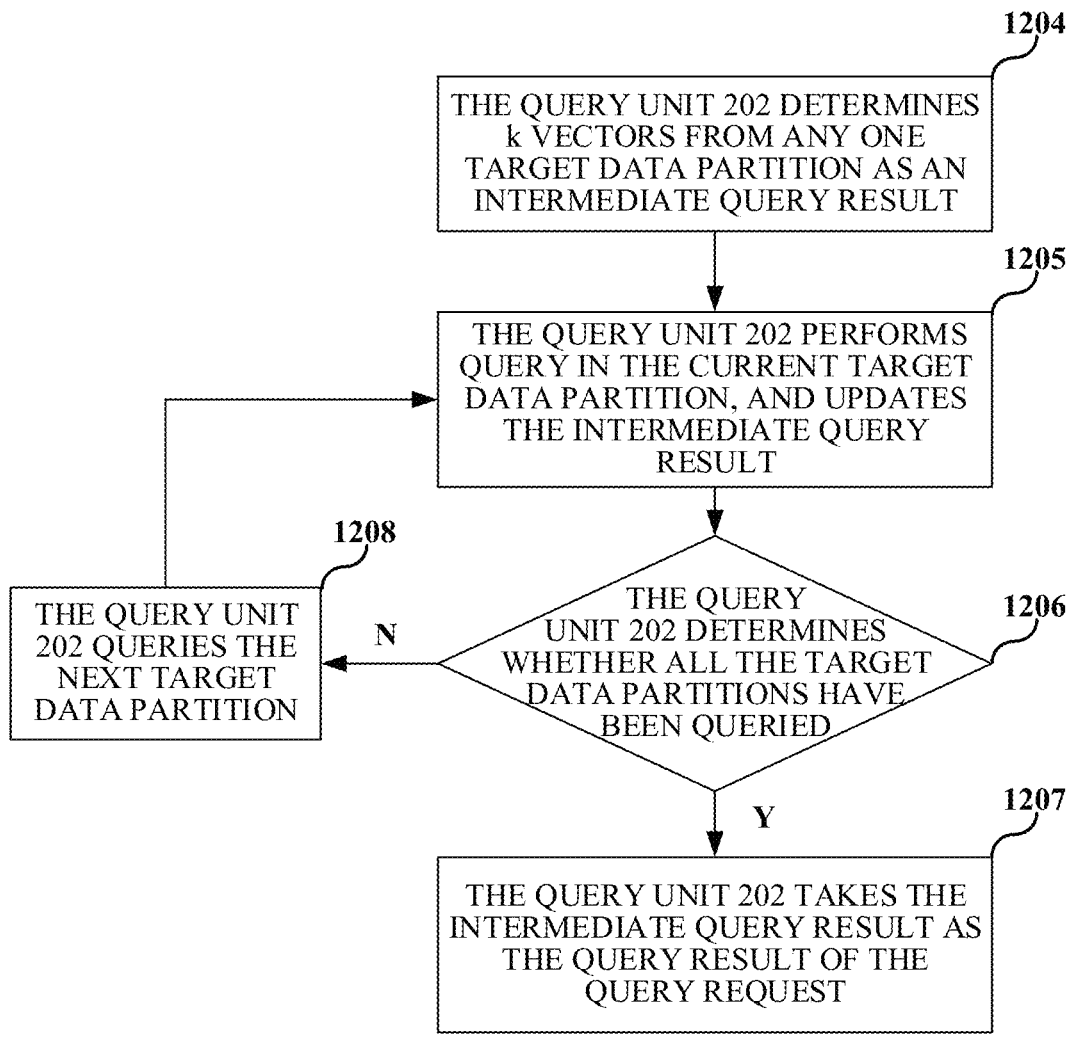
FIG. 12B illustrates a flowchart of determining query results from p target data partitions.

The technical scheme of the data query method provided by the embodiment of the disclosure is described based on the database system 200 shown in FIG. 1. FIGS. 12A and 12B illustrate flowcharts of a data query method according to an embodiment.

As shown in FIG. 12A, the process being at 1201. In 1201, the prediction unit 230 determines vector I corresponding to the distance between the query vector Q and center vector of each data partition. The prediction unit 230 determines the vector I corresponding to the distance between the query vector Q in the query request and the center vector of each data partition in the storage device 201 (hereinafter referred to as the distance vector I) after receiving the query request.

In some embodiments, assume that the vectors stored in the storage unit 201 are clustered into N data partitions, and $dc_i$ ($1 \leq i \leq N$) is the distance between the query vector Q and the center vector of the data partition $C_i$, so that the distance vector I may be an N-dimensional vector, denoted as I=($dc_1$, $dc_2$, ..., $dc_N$).

It will be appreciated that in some embodiments, the distance vector I may also include only small part of data $dc_1, dc_2, \ldots, dc_N$, for example, the dimension of the distance vector I may be N/4, that is, the distance vector I only includes the smallest N/4 of $dc_1, dc_2, \ldots, dc_N$.

Illustratively, in some embodiments, the distance $dc_i$ between the query vector Q and the center vector $ce_i$ of the data partition $C_1$ may be the Euclidean distance between Q=($q_1, q_2, \ldots, q_D$) and $ce_i$=($ce_{i(1)}, ce_{i(2)}, \ldots, ce_{i(D)}$), that is $dc_i$ can be computed by the following equation(6).

$$dc_i = \sqrt{\sum_{j=1}^{D}(q_j - ce_{i(j)})^2} \qquad (6)$$

It will be appreciated that, in other embodiments, the distance between the query vector Q and the center vector $ce_i$ of the data partition $C_i$ may also be other distances, such as vector inner product, Jecard distance, Valley distance, Hamming distance, Manhattan distance, Chebyshev distance, Mahalanobis distance, and the like, and is not limited herein.

In 1202, the prediction unit 230 inputs the query vector Q, the distance vector I, and result number k into the PCE-net model, and predicts the probing cardinality p. After determining the distance vector I, the prediction unit 230 inputs the query vector Q, the distance vector I, and result number k to the PCE-net model, and predicts the probing cardinality p.

In 1203, the query unit 202 determines p target data partitions from the storage unit 201. Based on the distance vector I determined in step 1201, the query unit 202 may determine p data partitions whose distance between the center vector and the query vector Q is the smallest, and take the p data partitions as target data partitions, which are not limited herein.

In 1204, the query unit 202 determines a query result from the p target data partitions. The query unit 202 determines a query result from the p target data partitions, and the query result includes k vectors which are the smallest distance from the query vector Q among the p target data partitions.

Illustratively, referring to FIG. 12B, the query unit 202 may determine query results from the p target data partitions in the following manner. In 1204: the query unit 202 determines k vectors from any one target data partition as an intermediate query result.

Illustratively, the query unit 202 may randomly determine k vectors from any of the target data partitions as intermediate query results. Further, the vectors in the intermediate query result are arranged in ascending order according to the distance between the vectors and the query vector Q, that is, dist $(vr_j, Q)$<dist $(vr_{j+1}, Q)$, where $vr_j$ is the jth ($1 \leq j \leq k$) vector in the intermediate query result.

It will be appreciated that in some embodiments, the query unit 202 may first randomly generate k vectors as intermediate query results, which are not limited herein.

In 1205, the query unit 202 performs query in the current target data partition, and updates the intermediate query result. The query unit 202 compare the distance dist$(v_y, Q)$ with the distance dist $(vr_k, Q)$, in which the dist$(v_y, Q)$ is the distance between any vector $v_y$ in the current target data partition and the query vector Q, and $(vr_k, Q)$ is the distance between the k-th vector $vr_k$ in the intermediate query result and the query vector Q. When dist $(v_y, Q)$<dist $(vr_k, Q)$, the vector $v_y$ is updated to the corresponding position of the intermediate query result so as to keep the vectors in the intermediate query result arranged in ascending order according to the distances between the vectors and the query vector Q.

It will be appreciated that in some embodiments, each vector $v_y$ of a data partition is arranged in ascending order of distance between each vector and the center vector of the data partition, i.e., the greater the y, the greater the dist $(v_y, ce_i)$, where $ce_i$ is the center vector of the current target data partition. Further, when the search direction is a reverse search, if dist $(v_y, Q)$>dist $(vr_k, Q)$, it is possible to end the query in the current target data partition by not judging the vector before vector $v_y$ (i.e., vector $v_1$ to vector $v_{y-1}$). When the search direction is a sequential search, if dist $(v_y, Q)$>dist $(vr_k, Q.)$, it is possible to end the query in the current target data partition by not judging the vector after the vector $v_y$. Thus, the number of times of calculating the distance between each vector in the target data partition and the query vector Q is reduced, resulting in improvement of the query efficiency.

For example, in some embodiments, assuming that the current target data partition is data partition $C_i$, and that the vectors in data partition $C_i$ are arranged in ascending order of the distance between each vector and the center vector $ce_i$. And, that the distance dist $(v_y, ce_i)$ between each vector (denoted $v_y$) and the center vector is stored in the data partition $C_i$. It is possible to determine whether to early terminate the query in data partition $C_i$ based on a distance lower bound, wherein the distance lower bound can be determined by the following equation (7).

$$LB_y = |\text{dist}(Q, ce_i) - \text{dist}(v_y, ce_i)| \tag{7}$$

wherein $LB_y$ denotes a distance lower bound corresponding to the vector $v_y$; |•| denotes compute absolute value; $ce_i$ is the center vector of the data partition $C_i$.

When the query unit 202 queries the data partition $C_i$, it can first determine the distance dist(Q, $ce_i$) between the query vector Q and the center vector $ce_i$, and then find the closest dist($v_x$, $ce_i$) to dist(Q, $ce_i$).) corresponding vector $v_x$. Secondly, the query unit 202 searches reverse from vector $v_x$, and the distance lower bounds corresponding to the vectors are computed one by one. If it is determined that the distance lower bounds $LB_z$ corresponding to the vector $v_z$ ($z \leq x$) is larger than dist ($vr_k$, Q), the distance lower bounds of the vector $v_{z-1}$ are not computed. Thirdly, the query unit 202 searches sequential from vector $v_x$, and the distance lower bounds corresponding to the vectors are computed one by one. If it is determined that the distance lower bounds $LB_u$ corresponding to the vector $v_u$ (u>x) is larger than dist ($vr_k$, Q), the distance lower bounds of the vector $v_{u+1}$ are not computed again. Finally, the query result of the query vector Q is obtained by calculating the distance between the vector $v_{z+1}$ to the vector $v_{u-1}$ and the query vector Q, meaning that it is no necessary to compute the distance between the query vector Q and the vector $v_1$ to $v_z$ or the vectors after vector $v_{u-1}$. Thus, the computation amount is reduced and the query efficiency is improved.

Figure 13:
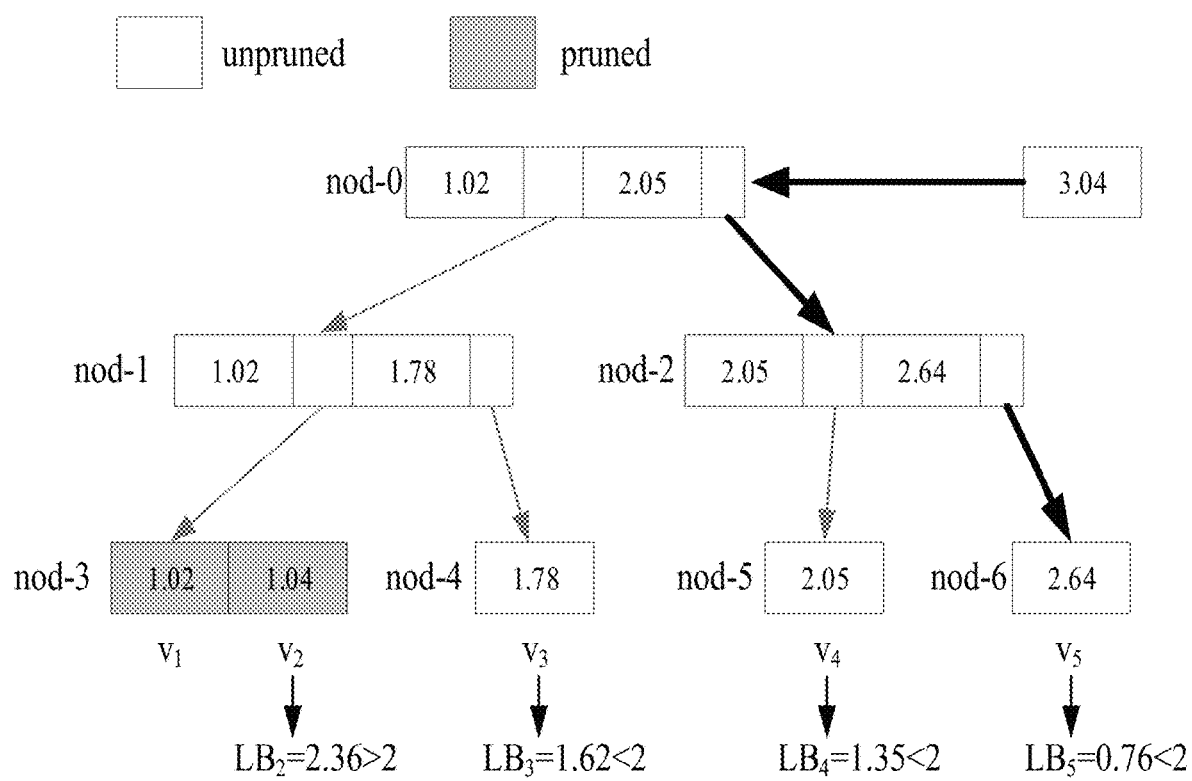
FIG. 13 illustrates a schematic diagram of vectors in a data partition $C_i$ stored through a B-tree.

FIG. 13 illustrates a schematic diagram of vectors in a data partition $C_i$ stored through a B-tree according to an embodiment. As shown in FIG. 13, the data partition $C_i$ includes 5 vectors, that is vectors $v_1$ to $v_5$, and the distance between the vectors $v_1$ to $v_5$ and the center vector $ce_i$ of the data partition $C_i$ is 1.02, 1.04, 1.78, 2.05, 2.64 respectively, and the key of each node (nod-0 to nod-6) in B-tree is the distance between each vector and the center vector $ce_i$.

Assuming that the distance dist ($vr_k$, $ce_i$) between the query vector Q and $ce_i$ is 3.40, the distance dist ($vr_k$, $ce_i$) between the k-th vector $vr_k$ in the intermediate query result the query vector Q and the query vector Q is 2. The query unit 12 may first determine that the key (2.6) of the node nod-6 is the closest one to the dist (Q, cei) in the data partition $C_1$. So that the query unit 12 may query the B-tree leftward from the vector $v_5$. Based on equation (6), the distance lower bounds corresponding to vector $v_5$ to $v_3$ are determined as follows: $LB_5=0.76$, $LB_4=1.35$, $LB_3=1.62$, and $LB_5$, $LB_4$ and $LB_3$ are all less than 2. But when the vector $v_2$ is queried, the distance lower bound corresponding to the vector $v_2$ determined based on the equation (6) $LB_2$ is 2.36, and 2.36>2. Hence, the distance between the vector $v_2$ to $v_1$ and the query vector Q do not need to be computed, the computation amount is reduced, and the query efficiency is improved.

It will be appreciated that in the embodiment shown in FIG. 13, since the vector $v_5$ is the last vector of the partition, there is no need to search sequentially. In other embodiments, if the vector corresponding to the key of each node in the partition is not the last vector of the partition, there is a need to search sequentially (i.e., to the right in B-tree).

Further, in some embodiments, the distance dist (Q, $v_y$) between the query vector Q and the vector $v_y$ in the data partition $C_i$ may be an asymmetric distance. The asymmetric distance of the query vector Q from the vector $v_y$ may be computed by the equation (8).

$$\text{dist}(Q, v_y)^2 = (Q - ce_i - g(r_y))^2 = [(Q - ce_i)^2 + (g(r_y))^2 + 2\langle ce_i, g(r_y)\rangle - 2\langle Q, g(r_y)\rangle] \tag{8}$$

wherein $r_y = v_y - ce_i$ represents the corresponding residual vector of the center vector $ce_i$ and the vector $v_y$; g(Y)

represents quantizing the vector Y, that is, representing vector Y by a vector approximating Y, for example g(Y) may represent quantize Y by Product Quantization (PQ).

To increase the computation speed, in some embodiments, the computation in equation (8) may be split into a cumulative sum of a plurality of sub-computations. For example, the query vector Q and the center vector $ce_i$ and the corresponding residual vector $r_y$ of the vector $v_y$ can be divided into M sub-vectors, that is, $Q=(Q_1, Q_2, \ldots, Q_M)$, $ce_i=(ce_{i(1)}, ce_{i(2)}, \ldots, ce_{yi(M)})$, $r_y=(r_{y(1)}, r_{y(2)}, \ldots, r_{y(M)})$. The above equation (8) may represent the following equation (9):

$$\text{dist}(Q, v_y)^2 = \Sigma_{j=1}^{M}(Q_j - ce_{i(j)} - g(r_{y(j)}))^2 = \Sigma_{j=1}^{M}[(Q_j - ce_{i(j)})^2 + (g(r_{y(j)}))^2 + 2\langle ce_{i(j)}, g(r_{y(j)})\rangle - 2\langle Q_j, g(r_{y(j)})\rangle] \quad (9)$$

It will be appreciated that the vectors may not be quantized in equations (8) and (9), but rather the exact values of the vectors may be used directly and are not limited herein.

Then the query unit 202 can compute the asymmetric distance between the query vector Q and the vector $v_y$ in the data partition $C_i$ by accumulating values of $(Q_j - ce_{i(j)} - g(r_{y(j)}))^2$ when j=1 to M based on the aforementioned equation (9). If the accumulated value is greater than or equal to $\text{dist}(vr_k, Q)$, the accumulated computation is early terminated so that it is unnecessary to compute the values of $(Q_j - ce_{i(j)} - g(r_{y(j)}))^2$ when j=f+1 to M, which is beneficial to reducing the computation amount and improving the query efficiency.

Specifically, for example, in some embodiments, the above equation (9) may be split into the following equation (10) and equation (11).

$$\Sigma_{j=1}^{M/2}(Q_j - ce_{i(j)} - g(r_{y(j)}))^2 \quad (10)$$

$$\Sigma_{j=M/2+1}^{M}(Q_j - ce_{i(j)} - g(r_{y(j)}))^2 \quad (11)$$

The query unit 202 can compute the equation (10) first. Then the query unit 202 computes the equation (11) while the computation result of the equation (10) is smaller than the distance $\text{dist}(vr_k, Q)$ between the k-th vector $vr_k$ in the intermediate query result and the query vector Q, otherwise, equation (11) is not computed, which beneficial to reduce the amount of computation and improve the query efficiency.

Returning to FIG. 12B, in 1206, the query unit 202 determines whether all the target data partitions have been queried. If the all the target data partitions have been queried, the query unit 202 proceeds to step 1207, otherwise proceeds to step 1208.

In 1207, the query unit 202 takes the intermediate query result as the query result of the query request. When all the target data partitions have been queried, the query unit 202 takes the current intermediate query result as the query result corresponding to the query request.

In 1208, the query unit 202 queries the next target data partition. If there is one or more the target data partitions that have not been queried, the query unit 202 proceeds to step 1205 to query the next target data partition.

According to the data query method provided by the embodiment of the disclosure, the database system 200 can predict the probing cardinality p according to the query vector Q, the result number k and distance vector I, so that the problem that the query efficiency is reduced due to the larger setting of the probing cardinality or the query recall is reduced due to the smaller setting of the probing cardinality can be avoided. Besides, when querying in the target data partition, the number of times of distance computation and the amount of computation when calculating the distance can also be reduced based on the method in the foregoing step 1204, which is beneficial to further improve query efficiency.

Further, in order to verify the technical effect of the data query method provided by the embodiment of the disclosure, a comparative experiment to compare the query time between the method provided by this disclosure and the IVFPQ method was performed, in which the datasets are SIFT dataset, the GIST dataset and the DEEP dataset. Specifically, FIG. 14A to 14C illustrates the query time comparison diagrams of the query method and the IVFPQ method based on the SIFT dataset, the GIST dataset, and the DEEP dataset.

Figure 14A:
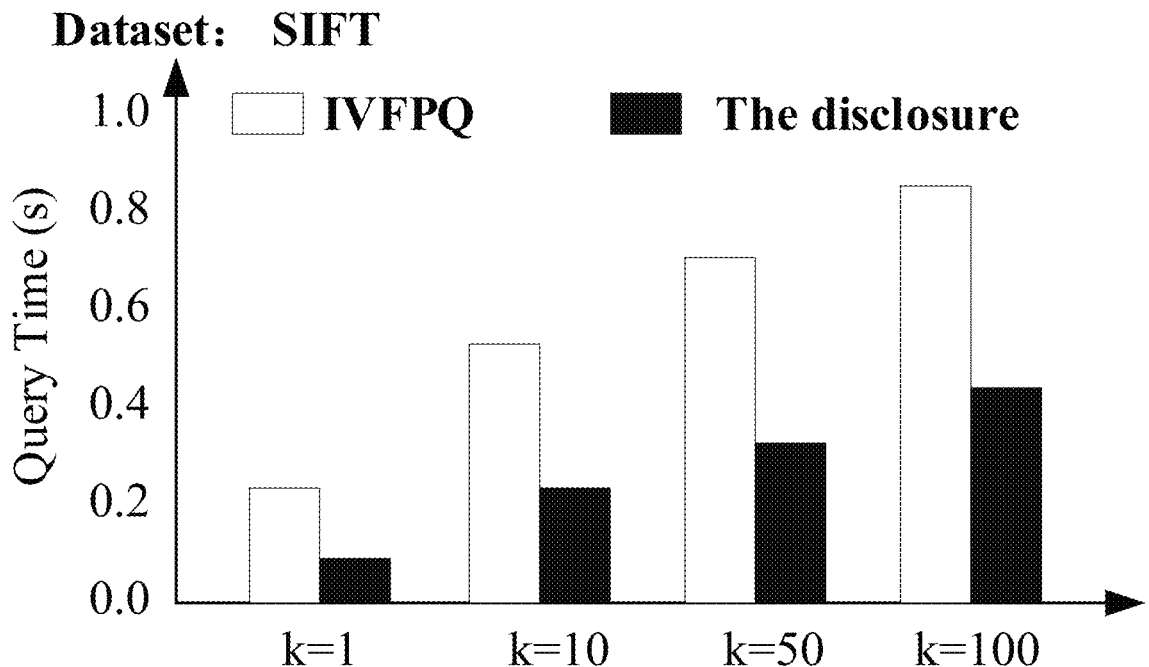
FIG. 14A illustrates a comparison of the query time on the SIFT dataset taking by the method in this disclosure and an IVF-Flat algorithm.
Figure 14B:
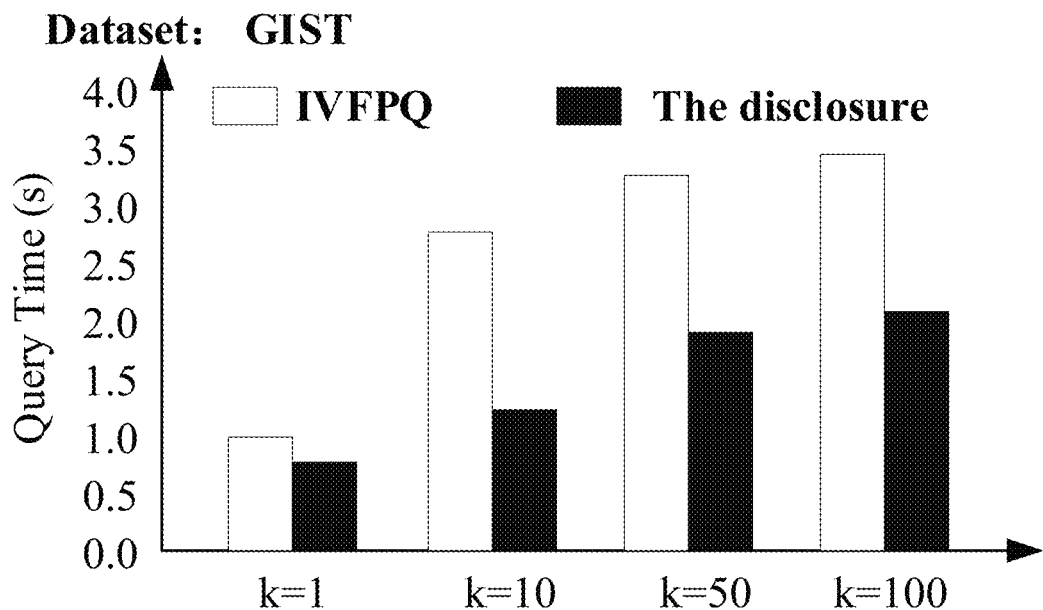
FIG. 14B illustrates a comparison of the query time on the GIST dataset taking by the method in this disclosure and an IVF-Flat algorithm.
Figure 14:
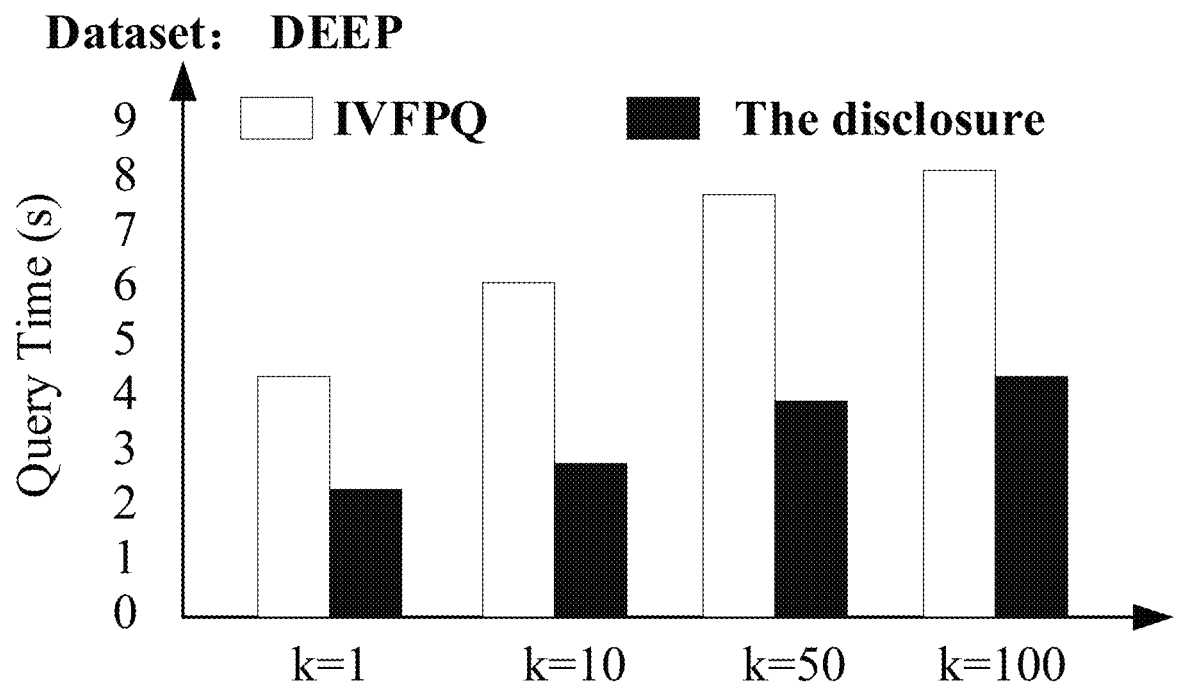
FIG. 14C illustrates a comparison of the query time on the DEEP dataset taking by the method in this disclosure and an IVF-Flat algorithm.

Referring to FIG. 14A to 14C, the ordinate represents the average query time for a plurality of query requests. In an experiment based on the SIFT dataset, the query method provided by this disclosure has an average query time of about ⅓ of the IVFPQ method at the query result number k=1, and an average query time of about ½ of the IVFPQ method at k=10 10, 50 or 100. In a GIST dataset-based experiment, the data query method provided by this disclosure has an average query time of about ⅘ of the IVFPQ method at the query result number k=1, an average query time of about ⅖ of the IVFPQ method at k=10, and an average query time of about ⅗ of the IVFPQ method at k=50 and 100. In the experiment based on the DEEP dataset, the data query method provided by this disclosure has an average query time of about ½ of the IVFPQ method when result number k=1, 10, 50 or 100. It can be seen therefrom that for different datasets and different numbers of query results, the query time of the query method provided by this disclosure is less than that of the IVFPQ method, which obviously shortens the query time and improves the query efficiency.

Figure 15:
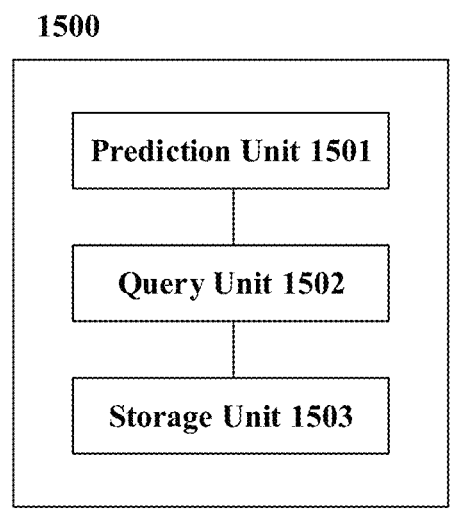
FIG. 15 shows a structural schematic of a data query apparatus.

Further, an embodiment of the disclosure provides a data query apparatus. As shown in FIG. 15, the data query apparatus 1500 includes a prediction unit 1501, a query unit 1502, and a storage unit 1503. The prediction unit 1501 is configured to predict the probing cardinality p corresponding to the query request based on the query vector Q, the result number k and the distance vector I. For example, the prediction unit 1501 may use the aforementioned PCE-net model to predict probing cardinality corresponding to the query request.

The query unit 1502 is configured to determine p target data partitions from the storage unit 1503, and obtain a query result corresponding to the query request from the p target data partitions. For example, in some embodiments, the query unit 1502 may obtain a query result corresponding to the query request through the aforementioned step 1203 and step 1204.

The storage unit 1503 is used to store data partitions. For example, each data partition in the storage unit 1503 may be obtained by clustering vector data in the database system 1 based on the aforementioned HBK-means, and the vectors in each data partition are arranged in ascending order of distances from the center vectors of the data partitions.

It will be appreciated that the structure of the data query device 1500 shown in FIG. 15 is merely an example. In other embodiments, the data query device 1500 may include more or fewer modules, or may incorporate or split partial modules, and is not limited herein.

It will be appreciated that the modules of the data query apparatus 1500 may be provided in the same electronic device or in different electronic devices, and are not limited thereto.

Figure 16:
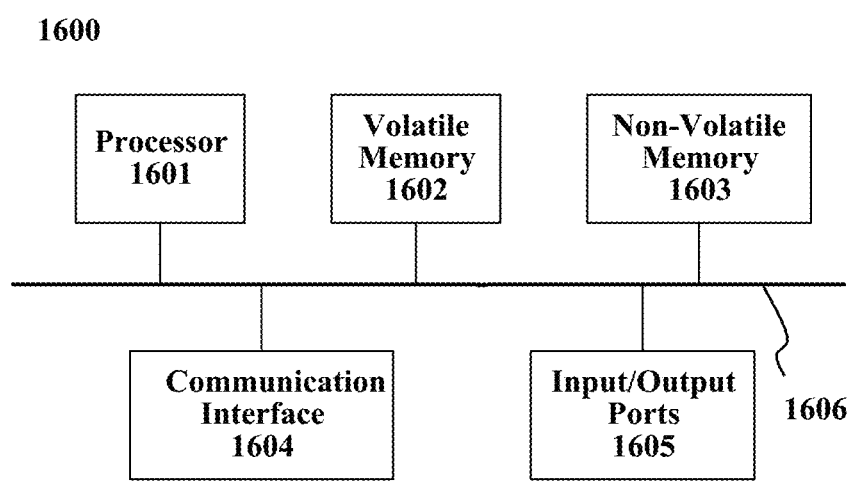
FIG. 16 shows a structural schematic of an electronic device.

Further, FIG. 16 illustrates a schematic structural view of an electronic device 1600. Here, the electronic device 1600 may be an electronic device running each module of the data query apparatus 1500 or an electronic device deploying each unit of the database system 200.

As shown in FIG. 16, electronic device 1600 may include one or more processors 1601, system memory 1602, Non-Volatile Memory 1603, communication interface 1604, input/output (I/O) Ports 1605, and bus 1606. The processor 1601 may include one or more single-core or multi-core processors. In some embodiments, processor 1601 may comprise any combination of a general-purpose processor and a special purpose processor (e.g., graphics processor, application processor, baseband processor, etc.). In some embodiments, processor 1601 may execute instructions corresponding to the data query methods provided by the foregoing embodiments. For example, an instruction is executed for predicting the probing cardinality p corresponding to the query request based on the query vector Q, the result number k and the distance vector I.

The system memory 1602 is volatile memory such as Random-Access Memory, Double Data Rate Synchronous Dynamic Random Access Memory, etc. The system memory is used to temporarily store data and/or instructions. For example, in some embodiments, the system memory 1602 may be used to temporarily store instructions of the data query methods provided in the foregoing embodiments, may also be used to store temporary copies of data partitions, may also be used to temporarily store query results of data query requests, etc.

Non-volatile memory 1603 may include one or more tangible, non-transitory computer-readable media for storing data and/or instructions. In some embodiments, non-volatile memory 1603 may include any suitable non-volatile memory and/or any suitable non-volatile storage device, such as Hard Disk Drive, Compact Disc, Digital Versatile Disc, Solid-State Drive, etc. The non-volatile memory 1603 may also be a removable storage medium, such as Secure Digital memory card or the like. In some embodiments, non-volatile memory 103 may be used to store instructions for the data query methods provided by the foregoing embodiments, may also be used to store temporary copies of data partitions, may also be used to temporarily store query results for data query requests, etc.

The communication interface 1604 may include a transceiver for providing a wired or wireless communication interface for the electronic device 1600 to communicate with any other suitable device over one or more networks. In some embodiments, communication interface 1604 may be integrated into other components of electronic device 1600, e.g., communication interface 104 may be integrated into processor 1601. In some embodiments, electronic device 1600 may communicate with other devices through communication interface 1604. The input/output (I/O) ports 1605 may be used to connect input/output devices, such as a display, keyboard, mouse, etc. Bus 1606 is used to provide appropriate access interfaces for the modules of the electronic device.

It is appreciated that electronic device 1600 may be any electronic device including, but not limited to, such as tablet computer, desktop computer, server/server cluster, laptop computer, handheld computer, notebook computer, desktop computer, ultra-mobile personal computer (UMPC), netbook, and the like, although embodiments of the disclosure are not limited.

It is appreciated that the structure of the electronic device 1600 shown in the embodiment of the disclosure does not constitute a specific limitation on the electronic device 1600. In other embodiments of the disclosure, electronic device 1600 may include more or fewer components than illustrated, or some components may be combined, or some components may be detached, or a different arrangement of components. The illustrated components may be implemented in hardware, software, or a combination of software and hardware.

Embodiments of the mechanisms disclosed herein may be implemented in hardware, software, firmware, or a combination of these implementation methods. Embodiments of the disclosure may be implemented as a computer program or program code executing on a programmable system including at least one processor, a storage system including volatile and non-volatile memory and/or storage elements, at least one input device, and at least one output device.

In some cases, the disclosed embodiments may be implemented in hardware, firmware, software, or any combination thereof, and may also be implemented as instructions carried by or stored on one or more temporary or non-temporary machine-readable (e.g., computer-readable) storage media, which may be read and executed by one or more processors.

In the drawings, some structural or methodological features may be shown in a particular arrangement and/or order. However, it should be understood that such a particular arrangement and/or ordering may not be required. Rather, in some embodiments, the features may be arranged in a manner and/or order other than that shown in the illustrative figures. In addition, the inclusion of structural or methodological features in a particular figure is not meant to imply that such features are required in all embodiments, and in some embodiments, these features may not be included or may be combined with other features.

It should be noted that each unit/module mentioned in each device embodiment of the disclosure is a logical unit/module. Physically, a logical unit/module may be a physical unit/module, or may be part of a physical unit/module, or may be implemented in a combination of multiple physical units/modules. The physical implementation of these logical units/modules per se is not the most important, and the combination of functions implemented by these logical units/modules is the key to solving the technical problem raised in the disclosure. In addition, in order to highlight the innovative part of the disclosure, the above-described device embodiments of the disclosure do not introduce units/modules that are not closely related to solving the technical problems posed by the disclosure, which does not indicate that other units/modules do not exist in the above-described device embodiments.

It should be noted that in the examples and descriptions of this patent, relational terms such as first and second, etc., are used solely to distinguish one entity or operation from another entity or operation without necessarily requiring or implying any such actual relationship or order between such entities or operations. Moreover, the terms "comprises," "comprising," or any other variation thereof, are intended to cover a non-exclusive inclusion, such that a process, method, article, or apparatus that comprises a list of elements does not include only those elements but also other elements not expressly listed or that are inherent to such process, method, article, or apparatus. Without further limitation, the element defined by the word "comprising" does not exclude the presence of additional identical elements in the process, method, article, or apparatus that comprises the element.

Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or +0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

While the disclosure has been illustrated and described with reference to certain preferred embodiments thereof, it will be appreciated by those of ordinary skill in the art that various changes in form and details may be made therein without departing from the spirit and scope of the disclosure.

We claim:

1. An apparatus comprising:
a memory storing instructions; and
a processor configured to execute the instructions to:
receive a query request for a storage device storing vector data, wherein:
the vector data is divided into a plurality of data partitions, each of the data partitions includes a center vector, and
the query request comprises a query vector and a result number;
predict, via a pre-trained deep learning model, a number of the plurality of data partitions to be queried based on the query vector, the result number, and a vector corresponding to one or more distances between the query vector and the center vector of each of the data partitions, determine from the plurality of data partitions at least one target data partition having a corresponding center vector that is least distant from the query vector, wherein the number of the at least one target data partitions is the same as the number of data partitions to be queried,
determine a query result corresponding to the query request from the at least one target data partition,
determine an intermediate query result, wherein a number of result vectors included in the intermediate query result is the same as the result number;
determine first type vectors of each at least one target data partition, wherein:
an absolute value of difference between a distance between a corresponding first type vector and a corresponding center vector of a corresponding data partition of the at least one target data partition storing the corresponding first type vector and a first distance is smaller than the distance between the corresponding first type vector and the query vector,
the first type vectors are a vector type having a largest distance from the query vector in the intermediate query result, and
the first distance is the distance between the center vector of the corresponding data partition of the at least one target data partition storing the corresponding first type vector and the query vector;
determine distances between the query vector and the first vector types;
update the intermediate query result according to the distances between the query vector and the first type vectors; and
take the intermediate query result as the query result of the query request after at least one target data partition are queried.

2. The apparatus of claim 1, wherein the processor is further configured to:
determine, via a first coding network, a first embedded feature of the query vector based on coding a plurality of sub-vectors of the query vector;
determine, via a second encoding network, a second embedded feature of the result number;
determine, via a third coding network, a third embedded feature of the vector corresponding to the distances between the query vector and the center vector of each of the data partitions; and
predict, via a decoding network, the number of data partitions based on the first embedded feature, the second embedded feature, and the third embedded feature.

3. The apparatus of claim 2, wherein:
the pre-trained deep learning model is trained based at least partially on the following loss function:

$$L = \frac{1}{m}\left[\sum_{j:p-p_j \geq p-s_j} \gamma(p-s_j-p-p_j)^2 + \sum_{j:p-p_j < p-s_j} (1-\gamma)(p-s_j-p-p_j)^2\right],$$

wherein L is a loss function, m is a number of query requests, $p-p_j$ is the number of data partitions to be queried corresponding to the j-th query request predicted via the pre-trained deep learning model, $p-s_j$ is the number of query data partitions to be queried with reference to the j-th query request, and γ is a super parameter smaller than 0.5.

4. The apparatus of claim 1, wherein:
the vector data is partitioned into the plurality of data partitions by a hierarchical clustering method.

5. The apparatus of claim 1, wherein:
the vector data in each of the plurality of data partitions are arranged in ascending order of distances between the vector data and the center vector of a corresponding data partition.

6. The apparatus of claim 1, wherein the processor is further configured to:
update a second type vector into the intermediate query result and delete the first type vector from the intermediate query result when the distance between the second type vector and the query vector is smaller than the distance between the first type vector and the query vector.

7. The apparatus of claim 1, wherein:
the distance between the query vector and each of the first type vectors is an asymmetric distance.

8. The apparatus of claim 7, wherein the processor is further configured to determine the distance between the query vector and each of the first type vectors by:
sequentially accumulating distances between M sub-vectors of the query vector and sub-vectors corresponding to a third type vector to obtain a distance between the query vector and the third vector, and
terminating the accumulating if a value after accumulating the distance between the Nth sub-vector of the query vector and the corresponding sub-vector is greater than the distance between the first type vector and the query vector, wherein M>1, 1≤N<M.

9. The apparatus of claim 1, wherein the processor is a component of a one or more query devices.

10. The apparatus of claim 9, wherein the one or more query devices communicate with one or more storage devices via network.

11. A method executed by one or more processors, the method comprising:
receiving a query request for one or more storage device storing vector data, wherein:
the vector data is divided into a plurality of data partitions, each of the plurality of data partitions including a center vector, and
the query request comprises a query vector and a result number;
predicting, via a pre-trained deep learning model, a number of the plurality of data partitions to be queried based on the query vector, the result number, and a vector corresponding to one or more distances between the query vector and the center vector of each of the plurality of data partitions;
determining from the plurality of data partitions at least one target data partition whose corresponding center vector is least distant from a corresponding query vector, wherein a number of target data partitions is the same as the predicted number of data partitions to be queried; and
determining the query result corresponding to the query request from the at least one target data partition, wherein further comprises:
determining an intermediate query result, wherein a number of result vectors included in the intermediate query result is the same as the result number;
determining first type vectors of each at least one target data partition, wherein:

an absolute value of difference between a distance between a corresponding first type vector and a corresponding center vector of a corresponding data partition of the at least one target data partition storing the corresponding first type vector and a first distance is smaller than the distance between the corresponding first type vector and the query vector,
the first type vectors are a vector type having a largest distance from the query vector in the intermediate query result, and
the first distance is the distance between the center vector of the corresponding data partition of the at least one target data partition storing the corresponding first type vector and the query vector;
determining distances between the query vector and the first vector types;
updating the intermediate query result according to the distances between the query vector and the first type vectors; and
taking the intermediate query result as the query result of the query request after at least one target data partition are queried.

12. The method of claim 11, wherein predicting, via a pre-trained deep learning model, the number of the plurality of data partitions, comprises:
determining, via a first coding network, a first embedded feature of the query vector based on coding a plurality of sub-vectors of the query vector;
determining, via a second encoding network, a second embedded feature of the result number;
determining, via a third coding network, a third embedded feature of the vector corresponding to the distances between the query vector and the center vector of each of the data partitions; and
predicting, via a decoding network, the number of data partitions based on the first embedded feature, the second embedded feature, and the third embedded feature.

13. The method of claim 11, wherein updating the intermediate query result comprises:
updating a second type vector into the intermediate query result and deleting the first type vector from the intermediate query result when the distance between the second type vector and the query vector is smaller than the distance between the first type vector and the query vector.

14. The method of claim 13 wherein:
the distance between the query vector and each of the first type vectors is an asymmetric distance; and the method further comprises:
sequentially accumulating distances between M sub-vectors of the query vector and sub-vectors corresponding to a third type vector to obtain a distance between the query vector and the third vector, and
terminating the accumulating if a value after accumulating the distance between the Nth sub-vector of the query vector and the corresponding sub-vector is greater than the distance between the first type vector and the query vector, wherein M>1, 1≤N<M.

15. A non-transitory computer-readable storage medium storing instructions, wherein the instructions, when executed on a machine, cause the machine to:
receive a query request for one or more storage device storing vector data, wherein the query request comprises a query vector and a result number;
predict, via a pre-trained deep learning model, a number of the plurality of data partitions to be queried based on the query vector, the result number, and a vector corresponding to one or more distances between the query vector and the center vector of each of the plurality of data partitions;

determine from the plurality of data partitions at least one target data partition whose corresponding center vector is least distant from a corresponding query vector, wherein a number of target data partitions is the same as the predicted number of data partitions to be queried;

determine the query result corresponding to the query request from the at least one target data partition;

determine an intermediate query result, wherein a number of result vectors included in the intermediate query result is the same as the result number;

determine first type vectors of each at least one target data partition, wherein:
- an absolute value of difference between a distance between a corresponding first type vector and a corresponding center vector of a corresponding data partition of the at least one target data partition storing the corresponding first type vector and a first distance is smaller than the distance between the corresponding first type vector and the query vector,
- the first type vectors are a vector type having a largest distance from the query vector in the intermediate query result, and
- the first distance is the distance between the center vector of the corresponding data partition of the at least one target data partition storing the corresponding first type vector and the query vector;

determine distances between the query vector and the first vector types;

update the intermediate query result according to the distances between the query vector and the first type vectors; and take the intermediate query result as the query result of the query request after at least one target data partition are queried.

16. The non-transitory computer-readable storage medium of claim 15, wherein the instructions cause the machine to:
- determine, via a first coding network, a first embedded feature of the query vector based on coding a plurality of sub-vectors of the query vector;
- determine, via a second encoding network, a second embedded feature of the result number;
- determine, via a third coding network, a third embedded feature of the vector corresponding to the distances between the query vector and the center vector of each of the data partitions; and
- predict, via a decoding network, the number of data partitions based on the first embedded feature, the second embedded feature, and the third embedded feature.

17. The non-transitory computer-readable storage medium of claim 15, wherein the instructions cause the machine to:
- update a second type vector into the intermediate query result and delete the first type vector from the intermediate query result when the distance between the second type vector and the query vector is smaller than the distance between the first type vector and the query vector.

* * * * *